(12) United States Patent
Johnson et al.

(10) Patent No.: US 7,904,348 B2
(45) Date of Patent: Mar. 8, 2011

(54) SYSTEM AND METHOD FOR ECATALOG SUPPLIER PORTAL

(75) Inventors: Jerry Joseph Johnson, Crosby, TX (US); Chris Kluczyk, Katy, TX (US); Raul Rom, Spring, TX (US); Paul E. Jarboe, Salt Lake City, UT (US)

(73) Assignee: ePlus Systems, inc., Herndon, VA (US)

( * ) Notice: Subject to any disclaimer, the term of this patent is extended or adjusted under 35 U.S.C. 154(b) by 1470 days.

(21) Appl. No.: 11/116,426

(22) Filed: Apr. 28, 2005

(65) Prior Publication Data

US 2005/0251409 A1 Nov. 10, 2005

Related U.S. Application Data

(60) Provisional application No. 60/567,780, filed on May 5, 2004.

(51) Int. Cl.
*G06F 17/30* (2006.01)
(52) U.S. Cl. ............................................. 705/27; 705/26
(58) Field of Classification Search .................... 705/27, 705/26
See application file for complete search history.

(56) References Cited

U.S. PATENT DOCUMENTS

| 6,505,172 | B1 * | 1/2003 | Johnson et al. | 705/27 |
| 2002/0065736 | A1 * | 5/2002 | Willner et al. | 705/26 |
| 2002/0184111 | A1 * | 12/2002 | Swanson | 705/26 |

FOREIGN PATENT DOCUMENTS

| WO | WO 01/50305 | 7/2001 |
| WO | WO 03/017036 | 2/2003 |

OTHER PUBLICATIONS

Business Wire; "ePlus selected to power Smurfit-Stone's product content management system," Jan. 8, 2003; Dialog file 20 #26923655, 3pgs.*

(Continued)

*Primary Examiner* — Robert M. Pond
(74) *Attorney, Agent, or Firm* — Stephen Gigante; Cha & Reiter, LLC

(57) ABSTRACT

A Supplier Portal is provided to allow a Supplier to self-author the business process elements (BPEs) of a business process (BP) to create, manage and publish rich-content for use in eCatalogs, Data Pools, Enterprise Resource Planning (ERP) systems, and other knowledge management situations. The resulting business process (BP) for content management incorporates the Supplier's business process (BP) model. At the business process (BP) level, self-authoring allows users to adapt business process elements (BPEs) such as workflows, approval rules and approver roles and permissions, event notification and metrics. At the activity level, self-authoring allows users to adapt business process elements (BPEs) such as user interaction templates, business process (BP) rules and user roles and permissions that relate to the input, configuration, rationalization, classification, value extraction, quality control, publication, and ongoing management of rich-content. The resulting published rich-content incorporates a supplier's unique way of doing business while adhering to the quality, integrity and consistency imposed by the Supplier Portal to achieve a seamless published rich-content such as an ecatalog. The Supplier Portal can be any and all of a hosted behind a firewall solution, accessible via a browser on at least one of a Personal Computer, hand held, or wireless/wired networked communication or standalone device.

22 Claims, 25 Drawing Sheets

OTHER PUBLICATIONS ePlus: "ePlus selected to power Smurfit-Stone's product content management system . . . ," Business Wire, Jan. 8, 2003, Dialog file 610 #00832067, 5pgs.* ePlus: "ePlus releases Content+ Catalog Creation and Mangement Solution," Business Wire, Nov. 13, 2001, Dialog file 621 #03046566, 3pgs.*

TPN Register TPN Marketplace Suppliers.

Enhancements and Changes Specific to TPN/Clarus Integration.

TPN Marketplace TPN Marketplace Bulletin; Delivered Nov. 6, 2000.

TPN Marketplace v3.5.07g Pre-Release Bulletin; Delivered Mar. 5, 2001.

TPN Marketplace v3.5.07i Pre-Release Bulletin; Delivered Mar. 19, 2001.

Erasing the Barriers to Achieving eProcurement ROI; A Joint White Paper from ePlus inc. and the Shelby Group, LLC.

Shopping, Content, and Supplier Enablement; One Size Does Not Fit All; An Executive White Paper.

TPN Register; Buyer Training Guide.

TPN Register; Supplier Training Guide.

TPN Marketplace; Buyer Administration Tool User Guide.

Johnson, Jerry; et al.; Patent Application Publication No: US 2005/0060324 A1; Publication Date: Mar. 17, 2005; "System and Method For Creation and Maintenance of a Rich Content . . . ;".

TPN Register TPN Marketplace Suppliers, date unknown.

Enhancements and Changes Specific to TPN/Clarus Integration, date unknown.

Erasing the Barriers to Achieving eProcurement ROI; A Joint White Paper from ePlus inc. and The Shelby Group, LLC, 2005.

Shopping, Content, and Supplier Enablement; One Size Does Not Fit All; An Executive White Paper, 2006.

TPN Register; Buyer Training Guide, date unknown.

TPN Register; Supplier Training Guide, date unknown.

TPN Marketplace; Buyer Administration Tool User Guide, date unknown.

* cited by examiner

* DENOTES REQUIRED FIELD

SUPPLIER REGISTRATION FORM

| | | | |
|---|---|---|---|
| SUPPLIER PROFILE* | NEW ▼ ~210 | A/P VENDOR NUMBER* | ~210 |
| SUPPLIER NAME* | ~210 | DUNS #* | ~210 |
| ADDRESS 1 | | ADDRESS 2 | |
| ADDRESS 3 | | ADDRESS 4 | |
| CITY | | STATE | |
| ZIP | | COUNTRY | |
| REMIT TO ADDRESS 1 | | REMIT TO ADDRESS 2 | |
| REMIT TO ADDRESS 3 | | REMIT TO ADDRESS 4 | |
| REMIT TO CITY | | REMIT TO STATE | |
| REMIT TO ZIP | | PHONE | |
| HOME PAGE | | FAX | |
| SALES REP NAME | | SALES REP EMAIL | |
| SALES REP PHONE | | SALES REP FAX | |
| CUSTOMER SERVICE NAME | | CUSTOMER SERVICE EMAIL | |
| CUSTOMER SERVICE PHONE | | CUSTOMER SERVICE FAX | |

TERMS*

| | | | |
|---|---|---|---|
| FOB POINT | | PAYMENT TERMS | |
| TAX STATUS | | FREIGHT TERM | |
| TRANSMIT METHOD* | EMAIL ⊙ <br> FAX ○ <br> EDI/XML ○ ~210 | ACCEPTS ORDER ATTACHMENTS | YES ○   NO ⊙ |
| EDI/XML CONTACT EMAIL | | EDI/XML CONTACT NAME | |
| EDI/XML CONTACT FAX | | EDI/XML CONTACT PHONE | |
| XML HTTP ADDRESS | | MRO/OEM | ☐ |
| SHIPPING METHOD* <br> 210 | BEST WAY ⊙ <br> GROUND ○ <br> 2nd DAY ○ <br> NEXT DAY AIR ○ | USER ACCESS* | PRODUCTION ☐ <br> SUPPLIES ☐ <br> TOOL & DIE ☐ <br> PLANT NAME/NUMBER ~210 |

[SUBMIT] [CANCEL]

Content + Portal

HOME | ACCOUNT MANAGEMENT | ITEM MANAGEMENT | CATALOG MANAGEMENT | REPORTS | HELP | LOG OUT

▸ePRO MARKETPLACE▸ OFFICE EQUIPMENT & SUPPLIES▸ OFFICE SUPPLIES▸ PENS, PENCILS, INKS & ACCESSORIES▸ MECHANICAL PENCILS

EDIT AN ITEM

SHORT DESCRIPTION
PENCILS MECHANICAL, 0.7 mm, BLUE, EACH

LONG DESCRIPTION
TITANIUM MECHANICAL PENCILS - BARREL COLOR METALLIC VIOLET BLUE, LEAD SIZE 0.7MM HIGH TECH STYLING WITH SMOOTH METALLIC GRIP FOR COMFORT AND CONTROL. TUFF STUFF JUMBO TWIST ERASER IS 6-1/2" TIMES LARGER AND LASTS UP TO TEN TIMES LONGER THAN OTHER ERASERS. INCLUDES THREE STANDARD LEADS. USES ERASER REFILL N464692.

LOAD PICTURE ⊙ ATTACHMENT ○

[BROWSE...]

[UPLOAD FILE]

| | |
|---|---|
| TYPE | $$$ |
| DIAMETER | 0.7 mm |
| MATERIAL | $$$ |
| COLOR | BLUE |
| UNIT OF MEASURE | |
| MANUFACTURER NAME | SANFORD CORPORATION |
| MANUFACTURER MODEL | $$$ |
| MANUFACTURER PART NUMBER | 64233 |
| SUPPLIER NAME | BOISE CASCADE OFFICE PRODUCTS |
| SUPPLIER PART NUMBER | 64233 |
| SUPPLIER NAME | BOISE CASCADE OFFICE PRODUCTS |
| COST | 2.37 |

⎫
⎬ 810
⎭

[SUBMIT] [CANCEL] [NEXT]

YOU ARE EDITING AN ITEM. ALL CHANGES ARE SUBJECT TO FURTHER APPROVAL.

SHOW ITEM HISTORY

[RESET]

FIG. 8

| EVENT | DATE | FIELDNAME | VALUE | OLDVALUE | USER NAME | APPROVALSTATUS | INITIALAPPROVALLEVEL | CURRENTAPPROVER | LASTAPPROVER | FUTUREAPPROVER | REJECTION CODE | REJ DE |
|---|---|---|---|---|---|---|---|---|---|---|---|---|
| NEW | 3/9/2004 11:46:27 AM | | | | CREYNOLDS | REJECTED | SUPPLIER ENABLER | CREYNOLDS | TDUMMER | | | |
| NEW | 3/9/2004 11:46:10 AM | | | | TDUMMER | ACCEPTED | SUPPLIER ENABLER | CREYNOLDS | TDUMMER | | | |
| NEW | 3/9/2004 11:45:28 AM | | | | EPROSE | ACCEPTED | SUPPLIER ENABLER | TDUMMER | EPROSE | CREYNOLDS | | |
| NEW | 3/9/2004 11:41:03 AM | | | | MBEROW | INITIAL | SUPPLIER ENABLER | EPROSE | 2 | TDUMMER | | |

Content + Portal

| HOME | ACCOUNT MANAGEMENT | ITEM MANAGEMENT | CATALOG MANAGEMENT | REPORTS | HELP | LOG OUT |

SELECT FIELD FOR FILTERING    SELECT OPERATOR ENTER OR DRAG AND DROP FILTERING STRING    SELECT OPERATOR TO COMBINE YOUR FILTERING CRITERIA

SELECT ALL | UNSELECT ALL | ACCEPT | REJECT          GO TO PAGE [1] OF 4    FILTER    RELEASE    RESET PAGE SIZE TO

UPDATED ITEMS APPROVAL

| | PRODUCTID | SUPPLIERNAME | VALUE | OLDVALUE | SUPPLIERSHORT DESCRIPTION | COST | UOH | APPROVAL LEVEL | APPROVAL STATUS | INITIAL APPROVAL LEVEL | CURRENT APPROVALS |
|---|---|---|---|---|---|---|---|---|---|---|---|
| FIELDNAME: CLASSDETERMINED | | | | | | | | | | | |
| ☐ | 2847528 | FASTENAL COMPANY | 1.37105 163.896 25418 920 | EPRO MARKETPLACE\ BUILDING SUPPLIES\ FASTENERS\BOLTS\EYE BOLTS | EYE BOLTS, TURNED, DIA: 3/16 INCH, SHANK L: 3 INCH, MATL: STEEL, FINISH: ZINC | 0.0984 | EA | LEVEL 2 | REJECTED | LEVEL 2 | MBEROV |
| FIELDNAME: COL_14 | | | | | | | | | | | |
| ☐ | 2847528 | FASTENAL COMPANY | KK | $$$ | EYE BOLTS, TURNED, DIA: 3/16 INCH, SHANK L: 3 INCH, MATL: STEEL, FINISH: ZINC | 0.0984 | EA | LEVEL 2 | REJECTED | LEVEL 2 | MBEROV |
| FIELDNAME: COL_15 | | | | | | | | | | | |
| ☐ | 2847528 | FASTENAL COMPANY | 3COM CORP. | $$$ | EYE BOLTS, TURNED, DIA: 3/16 INCH, SHANK L: 3 INCH, MATL: STEEL, FINISH: ZINC | 0.0984 | EA | LEVEL 2 | REJECTED | LEVEL 2 | MBEROV |
| FIELDNAME: COL_2 | | | | | | | | | | | |
| ☐ | 2849921 | GETFUZZY | 10 INCHES | 9 INCHES | DISHWASHERS, GETFUZZY, DISHES | 10.0000 | EA | LEVEL 2 | INITIAL | LEVEL 1 | MBEROV |
| FIELDNAME: COL_8 | | | | | | | | | | | |

FIG. 10A

| | | | | | | | | |
|---|---|---|---|---|---|---|---|---|
| ☐ | 2849910 | BLUE MEANIES | REDO | | ACCELERATORS ADHESIVE, USD, ANYWHERE, GLUE LIKE SUBSTANCE, IN A PAPER BAG, COLORS YES: NO, BG, SOMETIMES, DELIVERY DAYS:3 | 9.9900 | BG | LEVEL 2 | INITIAL | LEVEL 1 | MBEROV |
| ⊞ FIELDNAME: COL_9_ | | | | | | | | |
| ☐ | 2849894 | BLUE MEANIES | NBNMB | | PARTICLES ABRASIVE, SOME, WHY NOT, YL, BLUE123 | 6.6600 | YL | LEVEL 2 | INITIAL | LEVEL 1 | MBEROV |
| ⊞ FIELDNAME: COST | | | | | | | | |
| ☐ | 2849666 | TEMP LABOR COMPANY | 10.6989 | 10.7 | NOUN QUALIFIER: INDUSTRIAL - LIGHT, SERVICE DESCRIPTION: QUALITY ASSURANCE INSPECTOR. DURATION: 4 HOURS, LEVEL: SENIOR; PAY RATE: 10.70 NOUN QUALIFIER: | 10.7000 | HR | LEVEL 2 | INITIAL | LEVEL 2 | MBEROV |

FIG. 10B

Content + Portal

▶EPRO MARKETPLACE▶ OFFICE EQUIPMENT & SUPPLIES▶ OFFICE SUPPLIES▶ PENS, PENCILS, INKS & ACCESSORIES▶ MECHANICAL PENCILS
(105 PRODUCTS)

| | SKU NUMBER | DESCRIPTION | PRICE | UNIT | TYPE | DIAMETER | MATERIAL | COLOR | UNIT OF MEASURE | MANUFACTURER NAME | MANUFACTURER MODEL | MANUFACTURER PART NUMBER | SU N |
|---|---|---|---|---|---|---|---|---|---|---|---|---|---|
| 1 | 2H386 | MECHANICAL PENCILS | $2.5300 | EA/1 | | | | | EACH | JOHNSON | | 3400 | W.W GRE |
| 2 | N464233 | MECHANICAL PENCILS. DIA: 0.7 mm, COLOR: BLUE | $2.3700 | EA/1 | | 0.7 mm | | BLUE | EACH | SANFORD CORPORATION | | 64233 | BOI CAS OFF PRO |
| 3 | N4PD105TC | MECHANICAL PENCILS. AUTOMATIC. DIA: 0.5 mm, MATL: HI-POLYMER. COLOR: TRANSPARENT | $0.2600 | EA/1 | AUTOMATIC | 0.5 mm | HI-POLYMER | TRANSPARENT | EACH | PENTEL OF AMERICA LTD. | | PD105TC | |
| 4 | N464781 | MECHANICAL PENCILS. DIGIT. DIA: 0.5 mm, COLOR: BLACK | $1.9400 | EA/1 | DIGIT | 0.5 mm | | BLACK | EACH | SANFORD CORPORATION | | 64781 | BOI CAS OFF PRO |
| | | MECHANICAL PENCILS. AUTOMATIC. | $1.2600 | EA/1 | AUTOMATIC | 0.5 mm | HI-POLYMER | TRANSPARENT | EACH | PENTEL OF AMERICA LTD. | | PD105TA | BOI CAS OFF |

FIG. 13

Content + Portal

HOME | ACCOUNT MANAGEMENT | ITEM MANAGEMENT | CATALOG MANAGEMENT | REPORTS | HELP | LOG OUT

▸EPRO MARKETPALCE▸DEVICES▸TEMPORARY LATER SERVICES▸INDUSTRIAL-LIGHT
(3 PRODUCTS)

| | SKU NUMBER | DESCRIPTION | PRICE | UNIT | SERVICE DESCRIPTION | DURATION | LEVEL | PAY RATE | SUPPLIER NAME | SUPPLIER PART NUMBER |
|---|---|---|---|---|---|---|---|---|---|---|
| 1 | 1-101 | NOUN QUALIFIER: INDUSTRIAL-LIGHT, SERVICE DESCRIPTION: QUALITY ASSURANCE INSPECTOR, DURATION: 4 HOURS, LEVEL: SENIOR, PAY RATE: 10.70 | $10.70 | HR / | QUALITY ASSURANCE INSPECTOR | 4 HOURS | SENIOR | 10.70 | TEMP LABOR COMPANY | 1-101 |
| 2 | 1-102 | NOUN QUALIFIER: INDUSTRIAL-LIGHT, SERVICE DESCRIPTION: SUPERVISOR, DURATION: .1, LEVEL: SUPERVISOR, PAY RATE: 48.00. | $48.00 | HR / | SUPERVISOR | .1 | SUPERVISOR | 48.00 | TEMP LABOR COMPANY | 1-102 |
| 3 | 1-104 | NOUN QUALIFIER: INDUSTRIAL-LIGHT, SERVICE DESCRIPTION: LABORER, DURATION: .1, LEVEL: JOURNEYMAN, PAY RATE: 43.00, CAD, MAR 5 2004 12:00:00AM | $43.00 | HR / | LABORER | .1 | JOURNEYMAN | 43.00 | TEMP LABOR COMPANY | 1-104 |

— 1420

COMMON FEATURES — 1410

| UNSPSC | |
| --- | --- |
| UNIT OF MEASURE | HR |
| MANUFACTURER NAME | |
| MANUFACTURER MODEL | |
| MANUFACTURER PART NUMBER | |

UPDATE PRICE BY: [0] % [RUN]

ADD NEW PRODUCT — 1430
COPY PRODUCT FOR MODIFICATION
DELETE PRODUCT

Content + Portal

HOME | ACCOUNT MANAGEMENT | ITEM MANAGEMENT | CATALOG MANAGEMENT | REPORTS | HELP | LOG OUT

SHORT DESCRIPTION SETUP FOR CLASS CAPITAL           SEARCH — 1630

- ALL CLASSES
  - EPRO MARKETPLACE
    - ALL UNCLASSIFIED ITEMS
    - BUILDING SUPPLIES — 1610
    - CAPITAL
    - CONSUMER PRODUCTS
    - ELECTRICAL
    - ELECTRONICS, COMPUTERS & COM
    - ENERGY
    - FACILITIES MAINTENANCE
    - FIRE & SAFETY, RESPONSE & FIR****
    - FOOD & BEVERAGES
    - FOOD SERVICE EQUIPMENT
    - GASKETS, SEALS, & PACKINGS
    - INDUSTRIAL CHEMICALS
    - INDUSTRIAL MACHINERY & EQUIPME
    - LEASES
    - MATERIALS HANDLING & STORAGE
    - OEM EQUIPMENT & SPARE PARTS
    - OFFICE EQUIPMENT & SUPPLIES
    - PAINT, COATINGS & EQUIPMENT
    - PAYROLL & LABOR
    - PIPE, VALVES, HOSES, TUBING & ****
    - PROCESS CONTROLS, EQUIPMENT
    - PROCESS MACHINERY
    - ROTATING EQUIPMENT & MACHINER
    - SERVICES
    - TEXT SEARCH CATALOGS

| LABEL ☐ 1640 | VALUES ☐ 1650 | ATTRIBUTE LABEL | SKIP ☐ |
|---|---|---|---|
| ☐ | ☑ | SUPPLIERLONGDESCRIPTION — 1620 | DN |
| ☐ | ☑ | UNIT OF MEASURE | UP DN |
| ☑ | ☑ | MANUFACTURER MODEL — 1620 | UP DN |
| ☐ | ☑ | SUPPLIER NAME — 1620 | UP DN |
| ☐ | ☑ | SUPPLIER PART NUMBER | UP DN |
| ☐ | ☐ | COST — 1660 | UP DN |
| ☐ | ☐ | NOUN QUALIFIER | UP DN |
| ☐ | ☐ | UNSPSC | UP DN |
| ☐ | ☐ | MANUFACTURER NAME — 1620 | UP DN |
| ☐ | ☐ | MANUFACTURER PART NUMBER | UP DN |
| ☐ | ☐ | LIST PRICE | UP DN |
| ☐ | ☐ | PRICE CURRENCY | UP DN |
| ☐ | ☐ | EFFECTIVE DATE | UP DN |
| ☐ | ☐ | EXPIRATION DATE | UP DN |
| ☐ | ☐ | SHIPPABLE UNIT OF MEASURE | UP DN |
| ☐ | ☐ | COST UNIT OF MEASURE | UP DN |
| ☐ | ☐ | SUPPLIER SUCCESSOR PRODUCT | UP DN |
| ☐ | ☐ | COST CURRENCY | UP DN |

Template Definition

Business Process Element - Template

Template Description 2210
- Template Name: Select/Enter Name
- Description: Enter Description
- Created by: Select/Enter Name
- Created Date: Enter Date Roles 2220
- Roles - 1st Approver: Select/Enter Name
- Roles - Alternate Approver: Select/Enter Name Rules 2230
- Rule Name: Select/Enter Name
- If...: Enter Condition
- Then...: Enter Action
- Else: Enter Action Procedures 2240
- Step 1: Enter Name
- Step 2: Enter Name 2250
Example
Content Approval
Approve Content for Entry into Catalog
John Doe
1/1/05

Diane Smith - Dept Mgr
John Brown - Dept Supervisor

Content Approval Rule
If a Content Item Data Meets Supplier Standards
Then Check Item Approved Ready for Export
Else, Notify Material Specialist of Error to Correct 1 Import Cleaned Content Items Ready for Approval
2 Review Items Against Standards
... N ...

SYSTEM AND METHOD FOR ECATALOG SUPPLIER PORTAL

CROSS REFERENCE TO RELATED APPLICATION

This is a non-provisional application claiming the benefit of U.S. provisional application number U.S. No. 60/567,780 filed on May 5, 2004, the entire disclosure of which is hereby incorporated by reference.

BACKGROUND OF THE INVENTION

1. Field of the Invention

The present invention relates to a system and method for a supplier to self-author the catalog management steps of providing, cleaning, classifying, value extracting, quality controlling, and publishing catalog information describing products/items available from the supplier. More particularly, the present invention relates to a system and method for a Supplier Portal that is internet or network-accessible for a supplier to self-author the management of catalog information describing products/items available from the supplier.

2. Description of the Related Art

With the advent of eCommerce, adopters of this technology have been challenged to receive the promised ROI. Industry experts point directly to the failure of Suppliers and buyers not having a media process that will allow the parties to communicate via electronic data transfers all the requirements for a full life cycle of eCommerce Transactions. A Secondary Symptom to this is the failure of the parties to build a common language where product information can be transferred in a manner which will meets all of the business requirements of both parties.

Failures in eCommerce initiatives to date are directly related to the Cost of technology and the lack of communication protocols presented in a manner that buyers and sellers can relate to.

To address this need the parties must have a platform that will communicate the business requirements and encompass all the required business needs of all parties involved in the eCommerce transactions. A review of the business processes that require an interaction in eCommerce identifies the data elements that must fulfill the needs of the business processes that manage and control these transactions during a complete life cycle. An example some of these business processes, and potential Data Elements that can support them, include:

Shoppers: a review of the habits of people buying on the Internet shows that buyers need a certain level of product information to have confidence that what they are ordering will fit their needs. To inform the buyer the product information must present the data elements that will differentiate the product from other similar products, as an example: Electrical Tape, can be found in varying lengths and widths, but to meet industry standards different colors are also required for different applications where Black, Yellow and Red may address issues related to Safety, Process identifiers etc. A buyer looking within a catalog may find this tape, but without a unique characteristic of color the buyer would not be able to select the Tape they need.

Commodity Managers: These individuals within an organization are responsible for selecting supply sources, contracting with suppliers and verifying compliance. The data elements that support their business process are related to transaction information such as price, Quantities per price, Units of Measure, Delivery Dates, Commodity Coding—all Common data elements that allow comparisons for the same items from different sources.

Accounting: This process may require unique identifiers such as the Duns number for the Source of the Product, the Contracted Price, a commodity or unique code to charge the transaction to a budget.

To support true eCommerce and streamline the Procure to pay process there are business requirements place on Catalog data that is multi-Faceted. The process of collaborating with Supply sources must include the capability to express the requirements, to allow the requirements to be fulfilled and to communicate to submitters of product information whether those requirements are met or whether the information may need further input.

Gathering and transmitting these data elements can be a time consuming and costly task. To date supply sources have not met these requirements in general based on lack of technology that will lower the burden and lower the technical requirements on the supply community.

The Supplier Portal is designed to address these issues. This technology process provides a streamlined process on a simple technology platform that will allow suppliers to Create and manage their product information meeting all of the business objectives that Suppliers and buying organizations share, in a real-time collaborative web based environment.

Catalog creation and management are critical first steps in the Supply Chain Management process. Catalog creation involves the conversion of unstructured product/item data into structured information that is easily searched, compared, and selected for the purpose of ordering a product/item. Catalog management involves the ongoing data entry, updates, deletes, and modifications necessary to keep the catalog information complete, accurate and timely throughout the lifecycle of the products being presented for sale or other uses.

Many catalog management applications require a catalog information supplier team to continuously provide fresh data to a centralized administration team that is responsible for updating the catalog. The team members can be a part of the supplier's organization, or they can be members of an external group that is providing an outsourced service. If the team has to service multiple suppliers, delays in the catalog updating process can occur due to competing tasks and priorities, and information quality can suffer.

Since a supplier's economic success depends in part upon an ability to get the latest product information to potential buyers on a timely basis, it is essential that there be no delays or errors in the catalog management process, and that the resulting catalog information be up-to-date, complete and accurate. To maximize control of the presentation of up-to-date, complete and accurate catalog information to customers, suppliers need direct and timely access to their catalog information as well as user friendly tools that allow them to add, find, modify, quality control and delete their product information.

The term tool refers to the tools of the knowledge worker, and includes templates, rules engines, workflow processes, forms, pick lists, and other devices that provide suggested structures or processes that make it easier for the supplier to carry out content and catalog management processes.

To compete in today's fast changing competitive environment, a supplier needs greater speed, flexibility, functionality and self-authoring control than is provide by current catalog management applications.

Suppliers need tools that work for both Buy-Side and Sell-Side Product information. They need to manage product item data coming from their suppliers, as well as that being sent to their customers. Many applications in the field only work with either buy or sell side processes, but not both.

Suppliers need tools that facilitate the quick and easy online submittal of Images and Attachments (technical documents like product specifications, warranty agreements, wiring diagrams, Material Safety Data Sheets (MSDS) etc.) that are essential to providing catalog viewers with a "picture" of the items they are considering for purchase. Other applications in the field either do not facilitate online image management, or do so in a manner that is not quick and easy for a supplier not experienced with the process of managing images or attachments.

Suppliers need tools to help them classify product data items, and extract meaningful values for the product attributes. Many applications in the field require the supplier to have the skills to perform these tasks manually.

Suppliers need tools to help them determine what customers can view which catalog information.

Suppliers need tools that allow users with different roles and tasks to work on the same system at the same time, and even on the same task.

Supplier personnel need to be notified when an assigned task becomes available for completion. The Supplier Portal notifies task owners when an assigned task is available for work. This leads to improved process efficiencies by minimizing process delays.

Suppliers frequently choose to utilize material experts to help with aspects of catalog item classification and attribute value extraction.

Different aspects of catalog management require different types of approvals and suppliers need to be able to self-author user configurations, access rights and authorization.

Suppliers need to present their catalog items in different ways to different customers to meet marketplace requirements. Standards bodies like UCCnet are setting the standards by which product item data is structured, formatted, and defined.

Suppliers do not always know how potential customers want or need the product item data structured or defined.

Suppliers need to be able to have a shopping-like platform where they can simulate what their potential buyers will experience while shopping for their products.

Suppliers need catalogs of product item data that is easily searchable by untrained customers. Items that are not easily searchable are items that are not likely to be bought.

Suppliers need to quickly and easily publish rich-content product item data to multiple third party procurement applications.

Suppliers need extensive reporting capabilities to monitor the efficiency and effectiveness of their catalog management processes.

SUMMARY OF THE INVENTION

Thus, there is a need for a web-based supplier support facility/portal that allows suppliers to collaborate with a publisher in the capture of product/item data for the creation and maintenance of an eCatalog. This ability to "self author" provides a significant competitive advantage over suppliers who do not have this capability.

The present invention provides suppliers with a supplier portal comprising a system and method for an ecatalog Supplier Portal comprising tools and direct access they need to "self author" their catalog information throughout the production lifecycle for "rich content" data items. Rich content is defined as content that has the following characteristics:

It is structured—similar items are grouped in the same classification schema location and the same type of information is in the same place for each item;

It is normalized—the same information is consistent across all data items—i.e., a manufacturer's name is spelled the same way wherever it appears;

It includes intuitive descriptive information—each item is described with information that is written in terms that are commonly understood by the people using the information;

It is accurate when compared to the source information supplied by the manufacturer;

The product data items are defined in terms of attributes that help users compare and differentiate the items for purposes such as purchasing the items—the attributes can include technical specs, size, color, price, units of measure, commodity codes, model, manufacturer name, and many more that fit the user's business needs;

The items are fully searchable on all characteristics by different user types;

The items are parametrically searchable by attribute values;

The item information includes images, pictures, drawings and other attachments like MSDS, warranties, etc; and Each item is defined to the point that it can be assigned to at least one commodity class.

The system and method for a Supplier Portal according to the present invention allows suppliers to leverage immediate access to their product information or a typical e-catalog system, with just a standard web browser. Security rules of the present invention can limit supplier access to just the product information that pertains to their business.

The tools required by a supplier to produce rich content online catalogs are available through the Supplier Portal of the system and method of the present invention. When suppliers either navigate through the catalog view or search the system repository, the self-authoring functionality of the Supplier Portal allows them to easily edit, add, or delete products or product information. Alternatively, a batch load process can be used to perform complete file submissions. In a preferred embodiment, once the supplier "submits" its data for quality assurance, the person designated by the supplier to review the data quality, i.e., a Catalog Administrator, receives an email notification that catalogs or changes are awaiting their approval.

A preferred embodiment of the present invention includes:

1. Electronic Catalog Content Creation: Effective catalog content management allows an organization to import and create rich electronic catalog content. This includes the ability to offer detailed product text and images to an organization and its users. Also included are tools for quickly loading large quantities of catalog content into a central database or repository. The Supplier Portal of the present invention allows an organization to load and convert free-form, unstructured text descriptions into rich, organized catalog content searchable by keyword, attribute, or hierarchical structure. Catalog content may be entered manually or by importing catalog content from a formatted file obtained from an organization's supplier.

2. Catalog Content Organization: Organization of catalog content makes it feasible to quickly manage large quantities of catalog content on an ongoing basis, including enabling an hierarchical structure for grouping products. This includes creating different product views or assortments by user group. Importantly, this also includes the capability to preview product information before publishing it. The Supplier Portal allows an organization to create a hierarchical structure for grouping products consisting of product categories and subcategories configured to an organization's specifications.

The self-authoring functionality of the Supplier Portal allows an organization to create different product views of its catalog content, e.g., product views by commodity, by assigning shopper groups (user groups) to users. The Supplier Portal provides pattern recognition technology based on a comprehensive knowledge base of pre-defined pattern recognition rules, enabling an organization to quickly organize and categorize large quantities of catalog content, streamlining its electronic catalog content organization process and increasing productivity.

3. Catalog Content Delivery: Delivery of effective catalog content separates content data from layout and allows non-technical, business users to publish catalog content without the involvement of a third-party provider's technical staff. The Supplier Portal provides a comprehensive online supplier catalog, facilitating the self-authoring publication by an organization of its catalog content. The online supplier catalog allows users to search for a product by entering a keyword(s) or by using the available product categories and subcategories of the catalog.

4. Supplier Enablement: supplier enablement allows suppliers to participate with an organization in an organization's catalog content lifecycle. The Supplier Portal is a web-based application that provides a supplier a wide range of functions associated with self-authored management of the supplier's catalog content for its buying organizations. As a web-based, hosted application, in a preferred embodiment, the supplier component of the application requires only a standard browser and access to the Internet.

5. Workflow Management: Catalog content management allows an organization to implement catalog content approval workflows according to an organization's internal catalog content approval process. The Supplier Portal of the present invention provides a comprehensive Approval Management function that allows an organization to self-author and implement business rules within the Supplier Portal to correspond to the organization's internal catalog content approval process.

6. One-Click Web Interface: The web-based interface of the Supplier Portal of the present invention provides one-click access points to the different functional areas in the application.

7. Comprehensive Reporting: The Reports module of the present invention allows decision-making based on the catalog content information stored in the Supplier Portal catalogs. This module provides access to a range of catalog content reports, from a set of standard reports to customized reports that can be created for an organization. The parameterized aspect of the reporting tool allows the supplier to self-author the customized report outputs needed to assess the efficiency and effectiveness of their catalog management process. The module allows users to print reports, view reports as a display screen, or export report data to a file for use with external applications.

8. Integration: The Supplier Portal can be integrated/interfaced with other eProcurement or ERP systems, or existing business-to-business solutions or legacy systems.

This combination of direct and timely access, and supplier-friendly tools, allows the supplier to "self author" their content management process. By eliminating the need for catalog management specialists or services, the Supplier Portal allows a supplier to act rapidly, and efficiently to get the right product item information to the right buying audience at the right time. This self-authoring capability allows a supplier to streamline the catalog management process, eliminate the cost of intermediate services, reduce time delays, control the output quality, build internal expertise and achieve a competitive advantage.

In a preferred embodiment, the Supplier Portal of the present invention support supplier activities by providing functions required to maintain the flow of content between suppliers and a Web Catalog, or between suppliers and other data uses/users, on an ongoing basis. The functions of the Supplier Portal support self-authoring by owners and suppliers or the provisioning of authoring services by a third party and include:

Signing-up new suppliers;

Managing relationships with suppliers to facilitate the flow of information;

Managing day-to-day activities and communications between owners, suppliers and customers relative to rich content;

Establishing a schedule with owners and suppliers to ensure delivery of their updated content on a regular basis, consistent with predefined timelines;

Tracking customer, owner and supplier content inputs to ensure changes to content are reflected in all catalogs (Staging, and Production Catalogs);

Instructing owners and suppliers on self-authoring requirements;

Maintaining data integrity among multiple parties;

Providing User-defined multiple levels of security and authorizations which reflect the terms and conditions of underlying business contracts Enforcing compliance with business contracts terms and conditions, and agreed-to business processes among multiple parties;

Reducing the cost of transactions between parties

Improving the return on existing related data processing applications

Facilitating rich catalog maintenance which improves searchability and usability of procurement and sell-side applications; and Providing On-going web-based training.

As an example only, a business process that a supplier can establish using the Supplier Portal of the present invention may include the steps of:

Training Com Mgrs./Plant personnel/buyers on the Supplier Portal Content Management Solution;

Making initial contact by Com Mgrs./Plant Personnel with suppliers;

A Supplier loading a catalog into the Supplier Portal;

Automatically mapping and transforming the content into predefined category schemas with identification of additional content requirements;

Suppliers making enhancements and resubmits;

Notifying Catalog Administrators of the availability of new content, via email with a link to the Supplier Portal;

Administrators reviewing, analyzing, adjusting the new content in the catalog; and Administrators performing:
  a. Approval of the new content in the catalog;
  b. Approval of the new content in the Catalog and requesting further enhancement of the new content; and
  c. Denial of approval of the new content in the catalog and requesting required enhancements of the rejected new content.

BRIEF DESCRIPTION OF THE DRAWINGS

FIG. 2 illustrates Supplier Registration Profile;
FIG. 4 illustrates a Process Data Page;
FIG. 5 illustrates a Product Record Page;
FIG. 8 illustrates an Edit Product Record Page;
FIG. 9 illustrates an Item History Page;
FIGS. 10A and 10B illustrates an Approval Review Page;
FIG. 13 illustrates a Product List Page;
FIG. 14 illustrates a Product List Page—Common Features;
FIG. 15 illustrates a Product Information Page;
FIG. 16 illustrates a Short Description Setup Page;
FIG. 22 illustrates a template used to configure a business process element (BPE)

DETAILED DESCRIPTION OF THE INVENTION

Figure 1:
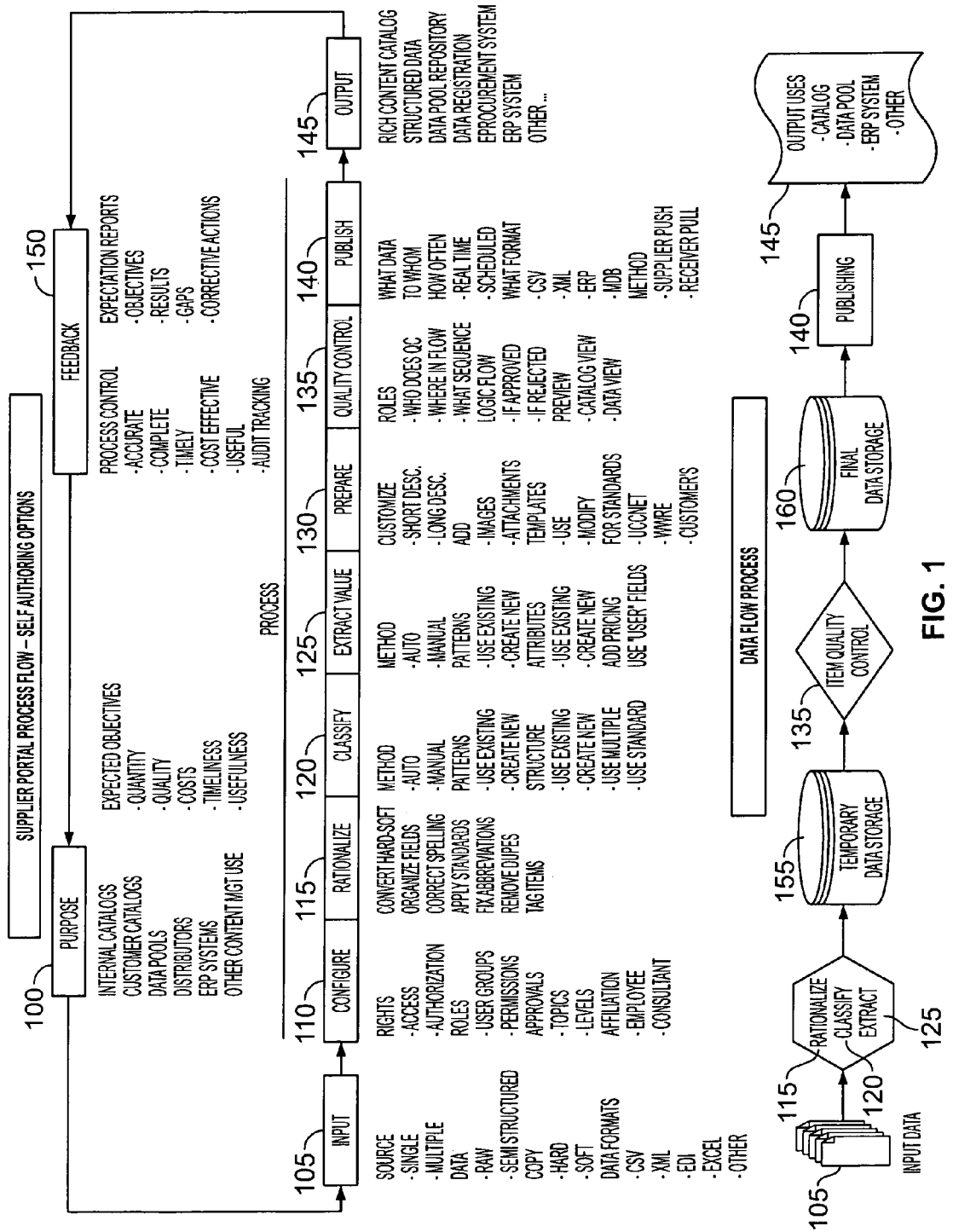
FIG. 1 illustrates a Supplier Portal Process Overview Diagram.

The system and method of the present invention provide a Supplier Portal for a supplier to self-author processes for product/item management and catalog management.
Supplier Portal Process Flow—Self Authoring Options FIG. 1 outlines a Supplier Portal Process Flow and the underlying Data Flow Process, and highlights a Self-Authoring Option available to the users/suppliers that can be chosen to instantiate their preferred business method(s). While FIG. 1 suggests a preferred process a supplier does not have to follow this preferred process, this is an example process only, presented for discussion purposes and not for limitation. The system and method of the present invention provides a supplier a selection of functions to "self author" a process to fit a supplier business model; steps can be omitted, the sequence of steps can be altered, and different sets of data can be subjected to different processes to meet different objectives.

The self-authoring process begins with the supplier's Purpose 100. The purpose(s) can include one or more of the following:
  to produce an internal catalog;
  to produce catalogs for customers;
  to output data to a data pool for subsequent use;
  to produce structured data that distributors can use to further promote the supplier's products;
  to produce output for ERP systems; and
  to produce content for some other knowledge management use.

In this example, the supplier has specified objectives for the process that include:
  increasing the quantity of items processed;
  increasing the quality of the data processed;
  decreasing the time it takes to process quality data;
  decreasing the total costs of producing quality data; and
  increasing the usefulness of the output to the recipient.

In the Input step 105, the supplier chooses from the various types of input the supplier can import, including:
  single or multiple sources of data;
  data that is in raw or structured formats;
  data that is in hard or soft copy; and
  electronic data that is in different formats such as comma separated variables (CSV), extensible markup language (XML), electronic data interchange (EDI), and excel.

In the Configure step 110 the supplier determines:
  who is to have what type of access and authorization rights throughout the process being defined;
  what user groups are created, who to assign to each group, and what permissions to grant to each group;
  what the approval steps are in the process, who is given approval authority, and what level of authority is given; and
  what roles internal personnel have, and what roles external personal (i.e., material experts, consultants, etc) have.

The Rationalize step 115 illustrates the actions the supplier can self-author to make unclean data more structured and consistent—and thus quicker, easier and more effective to process, including:
  converting hard copy data to an electronic format;
  moving data from improper fields to improve data organization;
  correcting misspelling to improve data consistency;
  modifying data to meet standards—such as required abbreviations;
  removing duplicate data; and
  tagging items to facilitate their proper classification.

The Classify step 120 highlights the self-authoring options available to the supplier to place the incoming data items into the proper place in the classification tree:
  selecting either the automatic or the manual mode of classification, or both for selected subsets of items;
  deciding when to use existing patterns, and when to create new ones to facilitate the classification; and
  deciding whether to use the default schema, create a new one, use multiple schemas, or adapt one of the standard schemas such as UCCnet.

The Extract value step 125 highlights the self-authoring options the supplier can take to place the incoming data item field values into the proper attribute fields. The options include:
  selecting either the automatic or the manual mode of extracting item field values into the proper attribute field, or both for selected subsets of items;
  deciding when to use existing patterns, and when to create new ones to facilitate the value extraction;
  deciding whether to use the default attributes, create new ones for internal use, or adapt existing values to fit external standards for core and extended attributes such as UCCnet; and
  decide how to add pricing data per item, and how to manage its constant change and update requirements.

The Prepare step 130 highlights the self-authorizing options the supplier can take to further prepare their data for rich-content applications, including:
  deciding how to structure the short and long descriptions that represent the data item in a catalog;
  deciding whether to add images or attachments to the item data to make it easier for end users to understand the item;
  deciding whether to use or modify existing templates to provide additional structure to the data to meet external requirements; and decide what data formatting and definition standards to comply with in order to be able to register the product data items in external data pools such as UCCnet.

The Quality Control step 135 highlights the self-authoring options the supplier can take to ensure the quality of the items that are published. These options include:

assigning responsibility for quality control, i.e., who is to review what items, in what phase, at what level of approval;

deciding how to handle items that are approved, and those that are rejected at any given phase; and deciding what catalog views to provide to which users at each phase in the process to help them see how the end user will be viewing the product data when it is published and in use.

The Publish step 140 highlights the self-authoring options the supplier can take to ensure that the items are published correctly, including:

deciding what data is to be published, to whom, in what format, on what schedule; and deciding on the method of data transfer, whether the supplier will push the data to the recipient or the recipient will pull the data from the supplier.

The Output step 145 highlights the self-authoring options the supplier has with regards to the data that is sent to the recipient, including:

rich-content catalog data that is structured, consistent, and contains images and attachments;

structured data files that can be imported into other systems;

data that is formatted and defined to meet the requirements of various data pools;

data that is formatted and defined to meet the requirements of various data registration standards bodies; and data that is formatted and defined to meet the requirements of various ERP systems.

The Feedback step 150 highlights the types of feedback the supplier is seeking to allow them to better self-author the options they choose in the future to improve the process the next time it is utilized, including:

metrics about the process itself, and how efficient and effective it is regarding elements such as; data accuracy, data completeness, the timeliness of the process, the cost effectiveness of the process, the usefulness of the output and audit tracking; and metrics about the results of their initial expectations, including; the initial objectives, the results against those objectives, the gap between what was expected and what occurred, and the corrective actions that are needed to close the gaps.

The Data Flow Process

As illustrated at the bottom of FIG. 1, in a preferred embodiment the steps in a Data Flow Process parallel the Supplier Portal Process Flow, and illustrate how the data moves as the process takes place, including:

receiving input data 105;
rationalizing 115 the received data;
classifying the rationalized data 120;
extracting values from the classified data 125;
storing the data in a temporary storage area to await quality control 155;
approving the quality of at least some of the data stored in the temporary storage 135;
moving the approved data from the temporary storage to a final storage area 160; and
selecting data stored in the final storage area to be published 140 to at least one target 145 selected from the group consisting of catalog, data pool, and ERP system.

Functions included in a preferred embodiment of the system and method of the present invention to support a supplier in self-authoring a business process include:

a. Administrator maintenance
 i. Administrator account setup
 ii. Approval management setup
b. Supplier maintenance
 i. Supplier account setup
c. User maintenance
 i. User Product View Setup
 ii. Pricing Model Maintenance
 iii. New Shopper Group Setup
 iv. User Account Setup
 v. Changing a Password
d. Item Management
 i. Importing Items
 ii. Import Data Updates
 iii. Add/enter Items
 iv. Edit/change/modify Items
 v. Delete Items
e. Catalog Management
 i. Review and Approve Catalog Content
 ii. Catalog Navigation
  (1) Viewing the catalog
 iii. Short descriptions
f. Reports
g. Database Schema The following sections discuss preferred embodiments of each of these functions and, by way of example only, provide screen shots of an implementation of a supplier portal according to the system and method of the present invention.

A. Administrator Maintenance

Administrator Account Setup

This function allows a Supplier Portal Administrator to:

create and maintain all system administrator accounts, supplier accounts, and user accounts;

create and maintain catalog content approval workflows, and supplier registration information, wherein an Approval Workflow function allows the user to specify for each of their suppliers who must review and approve catalog content before it can be published to the catalog;

create and maintain Supplier product views, user product views, user shopper groups, and pricing models; and change password information.

The Administrator Account Setup function of a preferred embodiment of a Supplier Portal allows the Administrator to specify the information that users can access and the functions users can perform in the application.

A preferred embodiment of a Supplier Portal includes at least three user profiles. The three user profiles are "System Administrator," "Supplier," and "Catalog User." Each user profile is a collection of privileges that can be assigned to one or more user account.

At least the following rules apply to the Setup of a Supplier Portal's at least three user profiles:

the System Administrator user profile provides a user full access to all available functions within the application;

the Supplier user profile provides a user full access to all the available functions within the Password Maintenance, Import Items, Add/Enter Item, Edit/Change/Modify Items, Deleted Items, Catalog Navigation, and Edit/Registration Form options of the Master Maintenance Menu page;

the Supplier user profile allows the user to create a user account for each of their organization's suppliers;

the Catalog user profile provides a user access to their organization's catalog such that each Supplier Portal user gets one and only one user account and an account provides identification information about the user, including the user's login ID and password;

the user profile (privileges) granted to a user account determines the information the user can access and the functions the user can perform; and any user involved with the catalog content approval process workflow(s) configured in the application for their organization must have an administrator user account.

Approval Management Setup

The following rules apply to Approval Management Setup:

supplier Portal allows the user to create a catalog content approval workflow for each of their suppliers;

a catalog content approval workflow refers to the business rules implemented within Supplier Portal to mimic an organization's internal catalog content approval process and therefore, a catalog content workflow can be as simple or complex as needed;

an organization's catalog content approval process is represented in a workflow by levels where a Level refers to the user or groups (of users) within an organization responsible for reviewing and approving a supplier's catalog content before it can be published to a catalog;

a catalog content approval workflow must contain at least one level. A level must contain at least one user;

a catalog content approval process workflow must be created for each supplier and one and only one workflow can be associated with a supplier;

a supplier may be assigned to the workflow for the supplier; and six default approval roles are "Supplier," "Material Expert at Host," "Supplier Allower," "Local Controller", "Commodity Manager," and "Additional Approvers" where approval roles refer to the groups of users in an organization responsible for reviewing and approving catalog content.

The Supplier approval role refers to the supplier of an approval process workflow.

The Material Expert approval role refers to the staff member(s) responsible for reviewing and approving catalog content for an approval process workflow to ensure the use of best practices for catalog content creation.

The Supplier Allower approval role generally refers to the supervisor at an organization responsible for reviewing and approving catalog content for all of the organization's approval process workflows.

The Local Controller approval role refers to the managers at the regional level of an organization responsible for reviewing and approving catalog content for individual approval process workflows.

The Commodity Manager approval role refers to the managers at the national level of an organization responsible for reviewing and approving catalog content for all of an organization's approval process workflows for a particular commodity or particular group of commodities.

The Additional Approvers role refers to the additional staff at an organization responsible for reviewing and approving catalog content for individual approval process workflows.

in addition to the default approval roles, the Supplier Portal application can implement any additional approval roles for use with an organization's catalog content approval process workflows;

approval roles are available for use across catalog content approval process workflows, the user(s) assigned to an approval role must be the same within a single workflow, and the user(s) assigned to an approval role can be different across workflows;

catalog content approval process workflows are defined as step approval processes, meaning Supplier Portal routes the catalog content for approval to the user(s) of each level of the assigned catalog content approval process workflow one level at a time;

after new catalog content is created using the Import Items or Add/Enter Item options in the Master Maintenance Menu page or existing catalog content is updated or deleted, Supplier Portal assigns the catalog content approval process workflow for the supplier to the catalog content, the catalog content cannot be published to the organization's catalog until each level of the catalog content approval process workflow approves the catalog content, and after the last step of the approval process approves the catalog content, Supplier Portal automatically publishes the catalog content to the organization's catalog;

if an approver rejects the catalog content submitted for his/her review and approval, Supplier Portal automatically routes the submitted catalog content back to the previous level of the catalog content approval process workflow for review and approval again;

as Supplier Portal routes catalog content through an organization for review, the users responsible for reviewing and approving catalog content receive email notification of the catalog content submitted for their review and approval, and then, using the Catalog Administration function accessible from the Master Maintenance Menu page, these approvers review and route submitted catalog content;

if a new supplier is created, then it is necessary to create a new administrator or supplier account, and then create the catalog content approval process workflow for the supplier, then Supplier Portal displays the new workflow, the administrator or supplier account displays by default as the first level of the workflow depending on the process followed, if a supplier account is created after the supplier product view is created then the Supplier is the first level by default. If not, the administrator is the first level by default, the level can be updated as needed;

there must be a minimum of one approval level with no maximum limit. However the system will display a warning message in the event of a particular supplier product view having only one approval level, with the level being either the supplier himself or just the administrator, and failure to have more than one level could result in the items routing directly to production without a proper QA; and deleting an approval level/approver in the midst of an item being in the approval cycle will result in the system prompting the administrator to proceed or not, if elected to proceed as an approval, the items/changes will move to the next level/approver even if this means the items moving to production with no more additional approvers after the one being deleted, if it's a rejection, then the items will move backward to the level/approver before the one being deleted, and if a particular field is already waiting for approval in the next level then the change coming from the approver that is going to be deleted will be ignored/lost and the same in the case of a rejection waiting in the previous level.

B. Supplier Maintenance

This function provides a central location for creating and maintaining supplier product views, supplier accounts, catalog content approval workflows, and to enter the supplier registration information. The Supplier Maintenance function allows the user to:

- create a new supplier product view, and modify or delete an existing supplier product view;
- create a new supplier user account, and modify or delete an existing supplier user account;
- create a new catalog content approval workflow, and modify or delete an existing catalog content approval workflow; and
- enter the supplier information needed to allow a supplier to register in the application.

The steps a user performs to configure a supplier for use in a Supplier Portal are: first create a product view for the supplier, then create a user account for the supplier, then create a catalog content approval workflow for the supplier, and then enter the basic supplier identification information needed to allow the supplier to register in the application.

The Supplier Account Setup

This function allows the user to enter the supplier identification information needed to allow a supplier to register in the application—FIG. 2. The following rules apply to Supplier Registration Form:

- the required fields of a supplier registration form must be completed for a supplier to allow the supplier to log into Supplier Portal and include: Supplier Name, Terms, Transmit method, Shipping method, A/P number, DUNS number, Accept order attachments, User access, Plant name/number; and
- when a supplier logs into Supplier Portal, the application provides the supplier access to the supplier's registration form such that the Supplier has a set of required fields to complete before he can load any data, including: Address, City, Zip, Sales Rep name, email, phone and fax.

C. User Maintenance

The User Maintenance function provides a central location for creating and maintaining user product views, catalog user accounts, shopper groups, and catalog pricing models. The User Maintenance function allows the Supplier Portal Administrator to:

- create a new user product view, and modify or delete an existing user product view;
- create a new catalog pricing model, and modify or delete an existing catalog pricing model;
- create a new shopper group, and modify or delete an existing shopper group; and
- create a new catalog user account (i.e., the requesters or shoppers that will be placing orders from an organization's catalog), and modify or delete an existing catalog user account.

User Product View Setup

In Supplier Portal, a user product view refers to a named group of one or more suppliers in a catalog to which a catalog user group is assigned. The following rules apply to User Product View Setup:

- user product views allow the administrator to create different pricing structures that are then applied to the different groups of users of a catalog and can be used to control which user groups have access to a supplier's products in a catalog;
- the administrator can create suppliers, and then assign them to user product views;
- the administrator can create user product views, and then assign them to shopper groups; and
- when a user product view is assigned to a shopper group, it allows any user in the shopper group to view the products of each supplier assigned to the user product view.

Pricing Model Maintenance

The Pricing Model Maintenance function allows the Administrator to specify the product pricing of a catalog for each shopper group, which includes specifying the markup of products. The pricing model components include: The name of the pricing model, the Main Markup %, the Freight Markup %, Other Markup %. The following rules apply to Price Model Maintenance:

- the Price Model Maintenance function is particularly helpful if different pricing has been negotiated with suppliers based on a shopper group;
- with pricing models in use, when a user displays a product in a catalog, Supplier Portal calculates and displays the price of the product based on the markup specified in the pricing model assigned to the user's shopper group;
- the administrator can create pricing models, and then assign them to shopper groups; and
- the pricing model is the captures, stores and uses an effective date and an expiration date to establish the start and end date of the time sensitive aspect of item pricing.

New Shopper Group Setup

In Supplier Portal, a shopper group is a role, or group designation, that the Administrator creates to apply to and categorize users by the products they are permitted to access in a catalog. The elements in a shoppers group include: the shoppers group name, the product view assigned, the pricing model assigned, the main markup %, the freight markup %, and the other markup %. The following rules apply to Shopper Group Setup:

- when a shopper group is created, it is associated with a user product view and a pricing model;
- the administrator creates a shopper group, and then assigns it to selected users;
- a Shopper Group can be assigned to one or more catalog user accounts;
- a Shopper Group can be created with a parent-child relationship with the parent having access to all the views of a child shopper group; and
- user product views, and a pricing model, must be created before creating shopper groups.

User Account Setup

The User Account Setup function allows the administrator to create and maintain the user accounts of an organization's catalog. The elements in a user account include: user name, id, password, email address, phone, fax, credit card number, and the user groups to which the user is assigned. The following rules apply to User Account Setup:

- a user account identifies a catalog user in the application and consists of a user's identification and login information. Catalog user refers to the requesters or shoppers that will be placing orders from an organization's catalog;
- the Administrator must create shopper groups prior to creating catalog user accounts.

Then they can assign shopper groups to catalog user accounts; and

- any user involved with using an organization's catalog must have a catalog user account.

Changing a Password

The user can elect to change their password. To do so they are required to enter their current password, the new password, and the new password again as a confirmation.

D. Item Management

Item management includes the functions of Import Items, Add/Enter Item, Edit/Change/Modify Items, and Delete Items. These functions allow a user to create and maintain an organization's catalog content. These functions allow a Supplier Portal Administrator to:

- import catalog content (product information) from a formatted file obtained from a supplier (Import Items function);
- enter catalog content manually (Add/Enter Item function);
- modify existing catalog content manually (Edit/Change/Modify Items function); and
- delete existing catalog content manually (Delete Items function).

Importing Items

The Import Items function is used to import/modify catalog content (product information) from a formatted file obtained from a supplier. The following rules apply to Import Items:

- the Import Items function can be used with a formatted file containing at least 20 product information records;
- the Import Items function supports an MS Excel (.xls) file containing the required and optional fields for each product record;
- the Import Items function allows a user to import multiple product information files at one time;
- importing a product information file includes correcting any errors Supplier Portal identifies in the file, and then classifying and processing each product information record in the file into the existing classes of an organization's catalog; and
- a Supplier Portal Administrator can only load/update the catalog content for the supplier of the approval process workflow they are currently assigned to.

The user follows the steps below to import new items:

1. From the main menu bar select Item Management>Import Items>Upload Data File.

Figure 3:
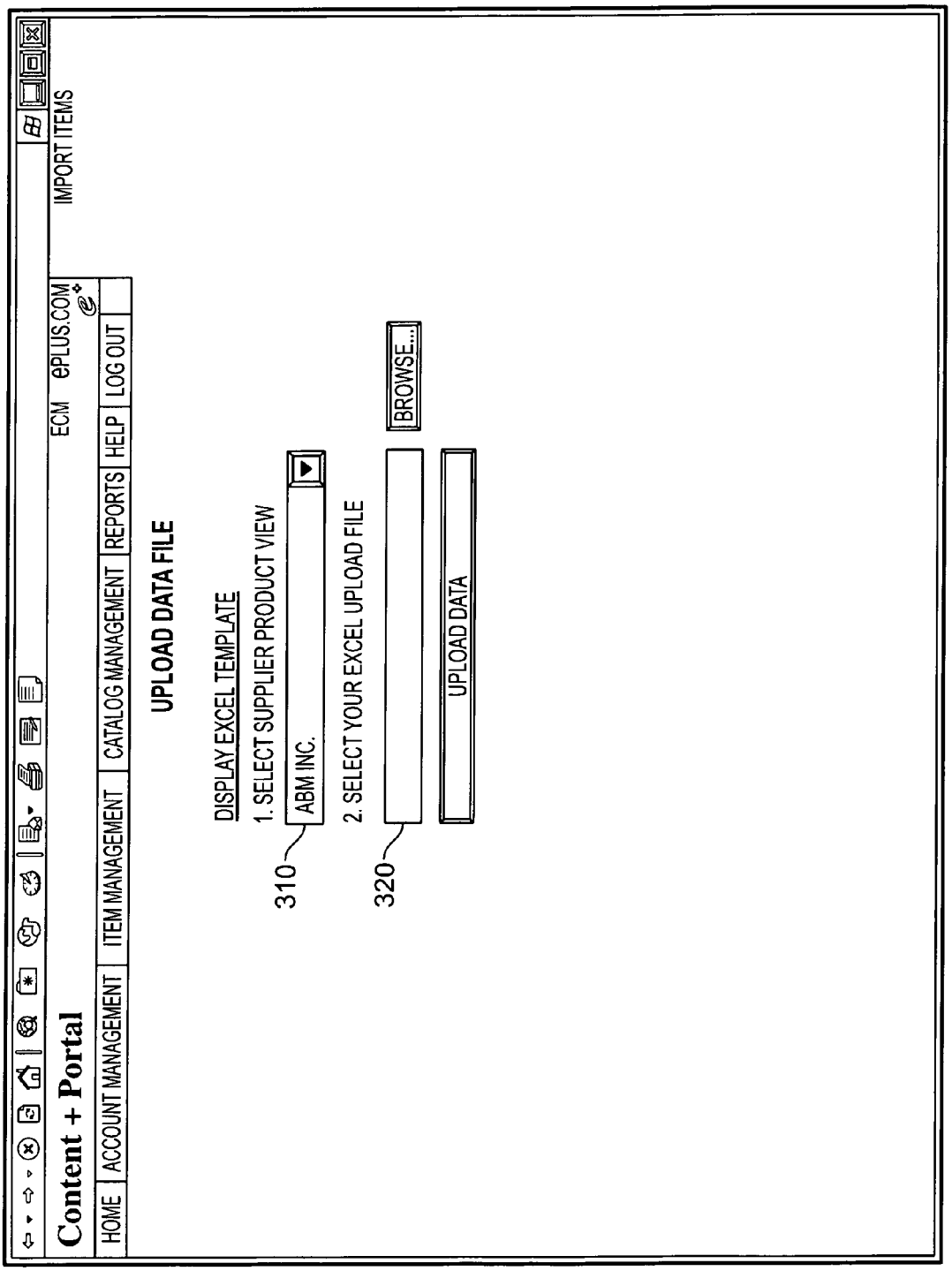
FIG. 3 illustrates an Upload Data File Page.

2. Select Upload Data File and the Upload Data File page will appear—FIG. 3. Here the user selects the supplier portal view 310 and the excel upload filename 320.

3. If the incoming product information is not in a supported file format, the user selects the Display Excel Template link to display the supported file format template. An Excel spreadsheet with the template to be used for loading the data is displayed. The template contains at least the following data item fields: product id, project id, supplier SKU #, supplier id, supplier name, UPC code, supplier short description.

4. The user copies or manually enters all of the product information into the template file.

5. The user saves the file to a local machine. By default, Supplier Portal saves the file to the C:\ drive of the local machine.

6. From the Upload Data File page, the user selects the Select Supplier Product View drop-down, and chooses the supplier of the product information.

7. In the Select An Excel Upload File field, the user enters the complete pathname of the product information file, or selects the Browse option to navigate to the file and select its name.

8. The user selects the Upload File option. A status pop-up window is displayed indicating the progress of the different stages during the data upload. The stages include: file ftp, Initializing, Loading file into memory, and loading data into data base. As the process unfolds, at least one pop-up window indicates the total # of records processed, and the percent of records processed from the total input file.

9. If the user has more than one product information file to import, after the pop-up window displays the "File ftp . . . " status for a file, the user may then upload the next file for processing.

10. After uploading each data file, from the main menu bar the user selects Item Management>Import Items>Track and Process Uploaded Data. The Table page is displayed listing the status of each uploaded product information file. This includes the project name, the table name, the start product id, the end product id, the rate of valid records, the link to the download error list, the link to the downward rejection list, the append data, the delete upload, the date, the user who created/imported the data, the user who updated the data, and the update date.

11. For the status of each uploaded file, the user review the Project, Table Name, and a Rate of Valid Records columns is displayed in the page for each file.

12. To review any errors in a file, the user selects the Download Error List link for the file.

13. Respond to the confirmation message that displays by selecting Yes. A Download Error List spreadsheet is displayed listing each error, including a description of each error, product id, the supplier SKU, the error code, and the error message.

14. The user selects the Download Rejections link to make the necessary corrective actions to the file.

15. The user responds to the confirmation message that displays by selecting Yes. Supplier Portal downloads the rejections list, and then displays the spreadsheet. The spreadsheet items include: the product id, the project id, the load event it, the supplier SKU, the supplier id, the supplier name, the UPCcode, the description, and the supplier long description.

16. The user corrects each error listed in the spreadsheet, and then repeats the above steps for each product information spreadsheet until no errors exist. Note:

- Supplier Portal allows the user to classify a product record with errors, but does not allow the user to add a product record with errors to the application.
- The Rate of valid records column and the Error/Rejections list reflect the information to both processes, Upload and Append. If the Append link is visible under the Append Data column then the Rate of valid records column and the Error/Rejections list reflect those of the Upload process. Otherwise they reflect those of the Append process. On the other hand since the Supplier Portal allows the user to process a data file with upload errors, then the Rate of valid records column and the Error/Rejections list reflect those of the Upload and Append processes together.

Figure 4:
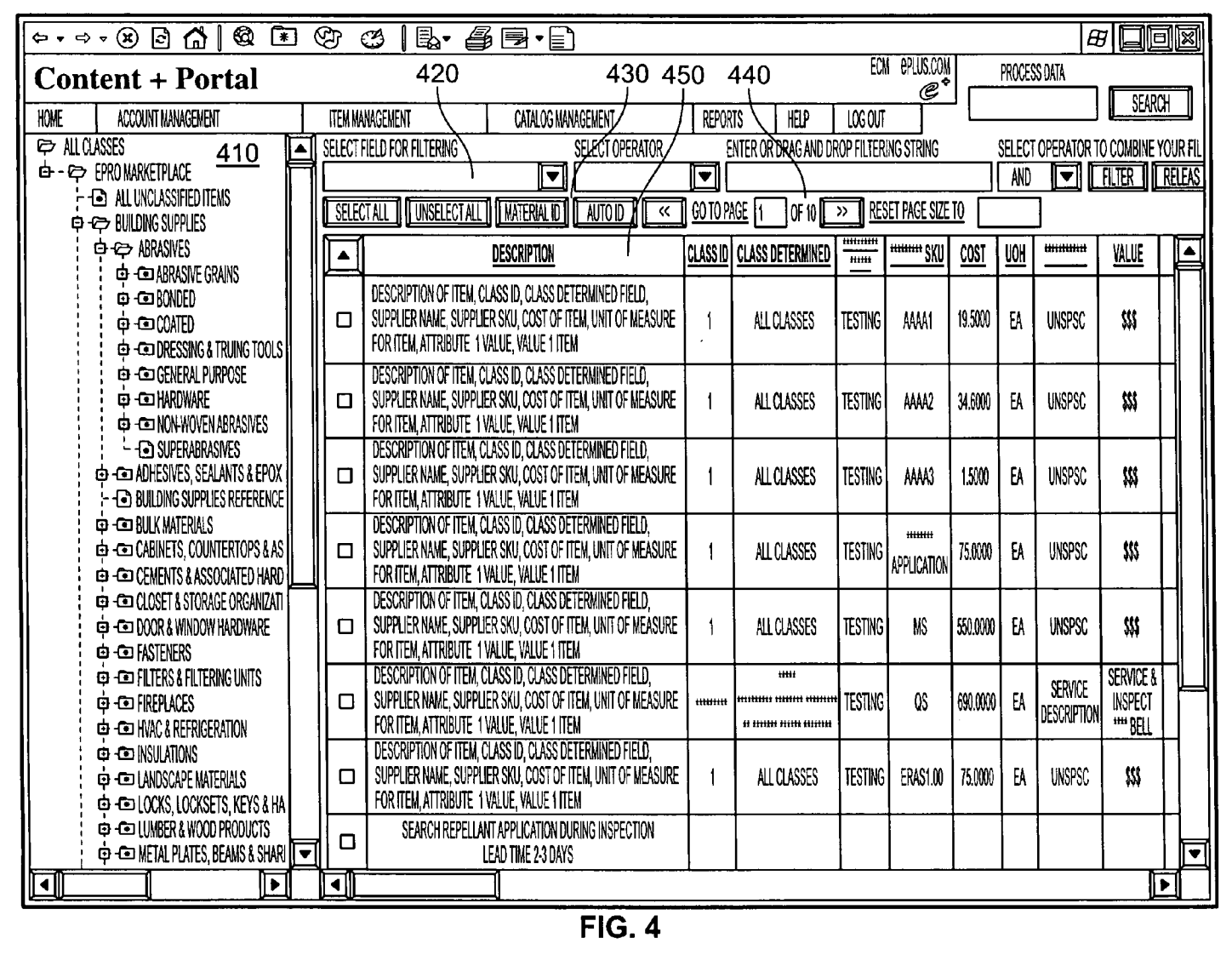

17. From the Table page, to classify and process the data of an imported product information file, the user selects the respective link for the file under the Table Name column. The Process Data Page displays for the file—FIG. 4.

The Process Data page contains the following items:
The left frame contains the item classification schema 410.
The right frame contains:

a. A filter section 420 which includes a field for filtering, an operator for filtering, a filter string, an operator (and, or) to combine the filter, a filter button, and a release button b. An action section 430 containing buttons which include: select all the items in the right frame, unselect all the selected items, manually classify the selected items, automatically classify the selected items c. A go to page section 440 which includes arrow icons that go to the first and last records in the screen, a page entry box to go to the entered page number, and a reset page size box to modify the page size d. An item section 450 which includes a check box for selecting the item, a description of the item, the class id of the item, the class determined field, the supplier name, the supplier SKU, the cost of the item, the unit of measure for the item, the attribute 1 value, and the value 1 item.

Before classifying each product record, in a preferred embodiment, the user sorts/groups the records into groups of similar products.

18. To use the auto-recognition process of the Supplier Portal of the present invention to automatically classify each listed product, the user selects the Auto ID option. Using an extensive knowledgebase of sophisticated recognition rules, the auto-recognition process analyzes the description and attribute fields of each product to determine which class a product most likely belongs to. For each product, the Class Determined column displays the class assigned to a product by the Supplier Portal. If the user uses the Auto ID option, the user must review each product assignment to ensure the Supplier Portal classified each product correctly. (Note that if "All Classes" displays in the Class Determined column for a product after using the Auto ID option, the user must use the Manual ID option to classify the product manually.)

To manually assign a product or group of products to a class, in the right pane of the page, the user selects each product, then in the left pane of the page navigates to and selects the class, and then selects the Manual ID option. For each product, the Class Determined column displays the assigned class of each product. If the user classifies a product or group of products manually, and then uses the Auto ID option, the Supplier Portal of the present invention overwrites these manual classification(s).

19. After classifying each product in the product information file, from the main menu bar, the user selects Item Management>Import Items>Track and Process Uploaded Data.

20. To add the product information to the Supplier Portal of the present invention, the user locates the table that was just processed and selects the Append hyperlink in the same row under the Append Data column. To delete the product information, the user selects the Delete hyperlink in the same row under the Delete Upload column. Note that after the user uses the Append Data option, the two columns—Start Product ID and End Product ID—display the respective numbers for each product record.

The user can append only those data that have passed all the validations. If there any records that did not append, the user can download the rejected records, correct them and re-upload them as a new file.

After the user adds the product information, a Supplier Portal according to the present invention associates the catalog content product information with a catalog content approval process workflow for the supplier and then, according to the assigned workflow, routes the content to the appropriate Administrator(s) for review and approval.

Import Data Updates

The Import Items function can also be used to load updates to existing catalog data. The following rules apply to Import Items for the purpose of making updates to existing catalog content:

the appropriate action codes in the SPI file (the formatted .xls file) must be used to update catalog content;

the action codes for updates include: UPPR (Update Price: List Price and Cost), UPDR (Update Record: Entire Record except ProjectID, SupplierID, SupplierSKU, Image Files, and Unit of measure), DEL(Delete Record); and a Supplier Portal Administrator can update at least the catalog content for the supplier of the approval process workflow that the Supplier Portal Administrator is authorized to update.

The user performs steps 1-16 to load the data file with the updates contained the formatted file containing all the updated records and the appropriate action codes.

To add the updates to, the user locates at least one table that has been uploaded and selects the Append hyperlink located in the same row under the Append Data column.

To delete the product information, the user selects the Delete hyperlink located in the same row under the Delete Upload column.

A Supplier Portal according to the present invention may take into consideration the following fields—Supplier ID, SupplierSKU, Cost, and unit of measure of each record to identify the exact record and make the appropriate corrective action. If any of these fields individually or combined do not match that of an existing record then that item gets rejected. The user can download the rejected records, fix them and re-upload them as a new file.

Add/Enter Items

The following rules apply to Add/Enter Items:

the Add/Enter Items function is used to enter catalog content (product information) manually; and a Supplier Portal Administrator can Add/Enter at least the catalog content for the supplier of the approval process workflow that the Supplier Portal Administrator is authorized to update.

To add an item manually, the user performs the following steps:

1. From the main menu bar selecting Item Management>Add an Item to access the Add/Enter Items page. The page has two frames, and shows the hierarchical structure of the organization's catalog in the left frame.

2. From the Add/Enter Items page, searching for a class into which to enter an item by entering a keyword(s) in the box in the right hand frame, or by navigating the available parent and child classes of the catalog in the left hand frame.

a. To use the Keyword search, In the Search field, entering a keyword(s). The Add/Enter Items page redisplays, showing the list of the classes that contain the keyword (s). Select a class link to display the Add/Enter Items page for the class.

b. To search for a class by navigating the available parent and child classes of the catalog, from the left pane of the page selecting the parent class folder under the All Classes folder to display the child class folders of the parent class folder. From the left pane of the page, navigating to and selecting the class to which an item is to be added.

Figure 5:
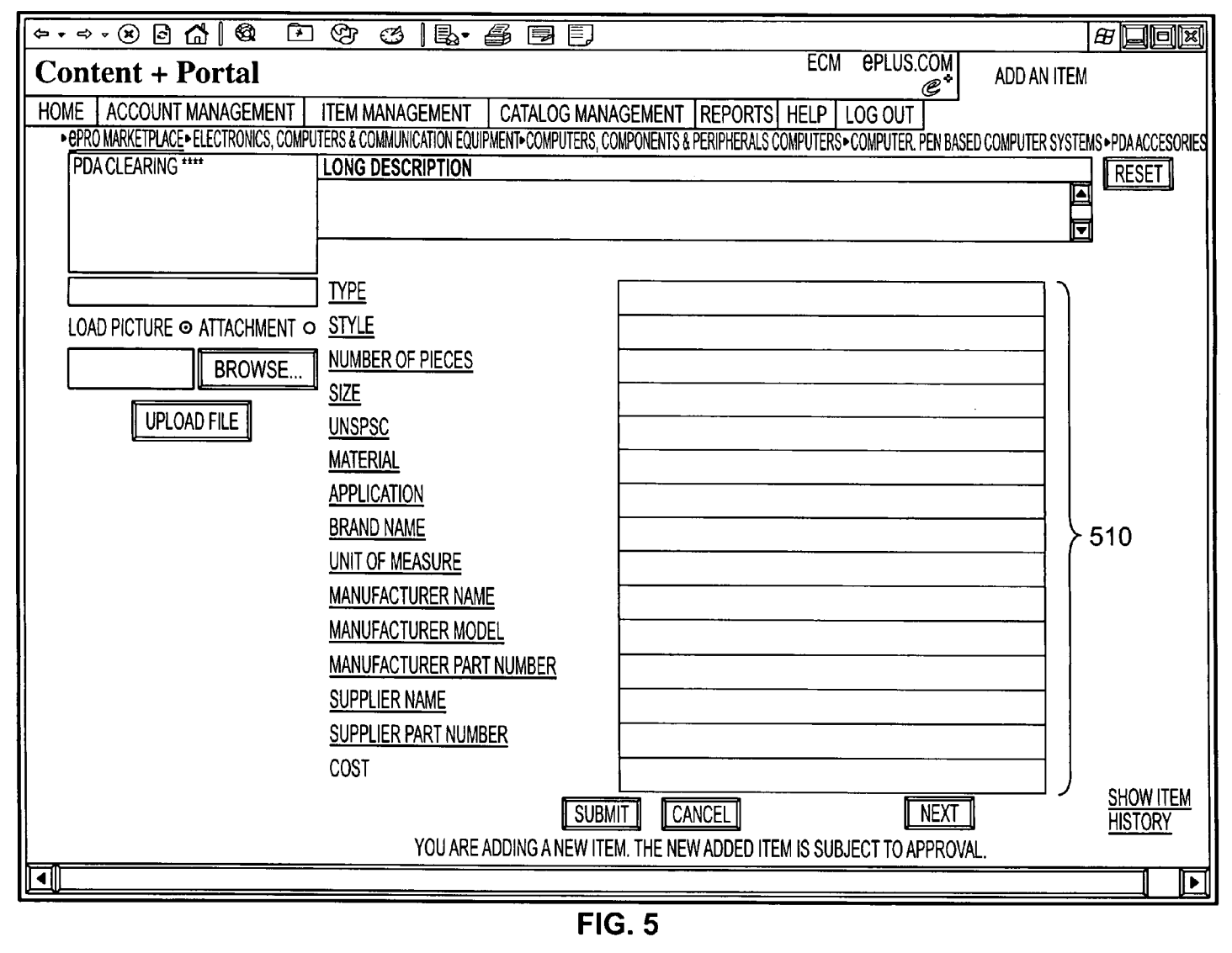

3. With the desired class folder highlighted, selecting the Add option to access the Product Record page—FIG. 5.

4. Filling in the appropriate fields 510, as necessary, or selecting an attribute link to select from the complete list of available values. The attribute fields displayed vary depending on the attributes associated with the selected class.

The fields that can be filled-in include the: item long description, type, style, number of pieces, size, UNSPSC, material, application, brand name, unit of measure, mfg name, mfg model, mfg part number, supplier name, supplier part number, and cost.

For the Manufacturer Name field the user enters an existing value or creates a new value on-the-fly. When creating a new manufacturer name on-the-fly, in a preferred embodiment the user adheres to their organization's naming convention for manufacturer name. When the user creates a new manufacturer name on-the-fly, the user must enter a checkmark in the "new name" check box. Doing so causes the Supplier Portal of the present invention to send an email notification to a System Administrator informing that a new manufacturer name has been created.

5. To upload a product picture for the product, the user selects the Load Picture option, and then selects Browse to navigate to and select the picture file.

6. To attach a file to the product, the user selects the Attachment option, and then selects Browse to navigate to and select the picture file.

7. The user selects Submit to add the product information. After the user adds the product information, a Supplier Portal according to the present invention assosicates the catalog content product information with a catalog content approval process workflow for the supplier and then, according to the assigned workflow, routes the content to the appropriate Administrator(s) for review and approval.

Edit/Change/Modify Items

The following rules apply to Edit/Change/Modify Items:
  the Edit/Change/Modify Items function is used to modify existing catalog content (product information) manually.
  a Supplier Portal Administrator can Edit/Change/Modify Items in at least the catalog content for the supplier of the approval process workflow that the Supplier Portal Administrator is authorized to update.

To update an item manually a user performs the following steps:

1. From the main menu bar the user selects Item Management>Edit/Change/Modify Item to access the Edit/Change/Modify Items page. The page has two frames. The left frame shows the hierarchical structure of the organization's catalog.

2. From the Edit/Change/Modify Items page, the user can search for an item to edit by entering a keyword(s) in the box in the right frame or by navigating the available parent and child classes of the catalog in the left frame and locating the exact item to edit.

Figure 6:
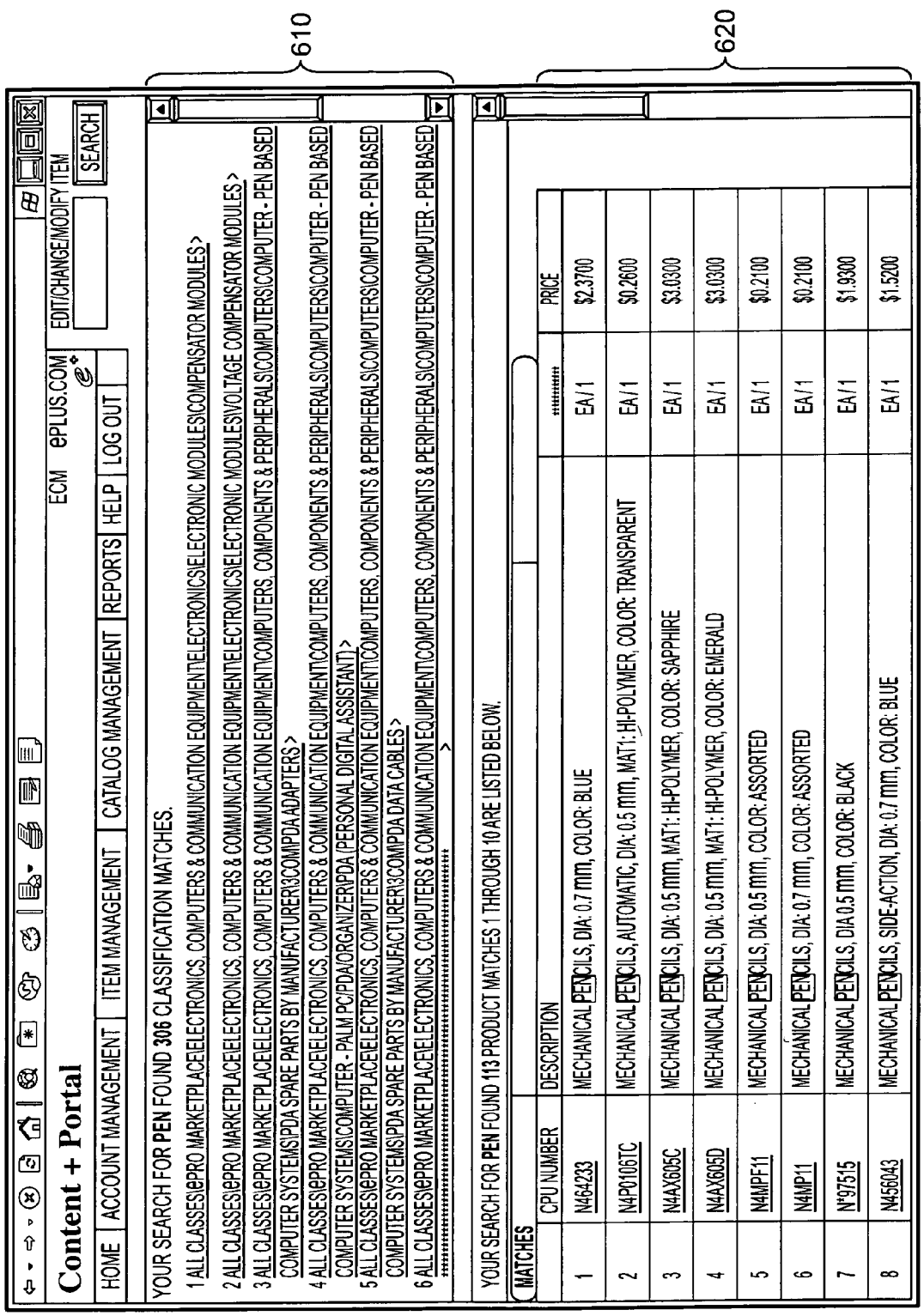
FIG. 6 illustrates an Edit/change/modify Items Page Search Results.
Figure 7:
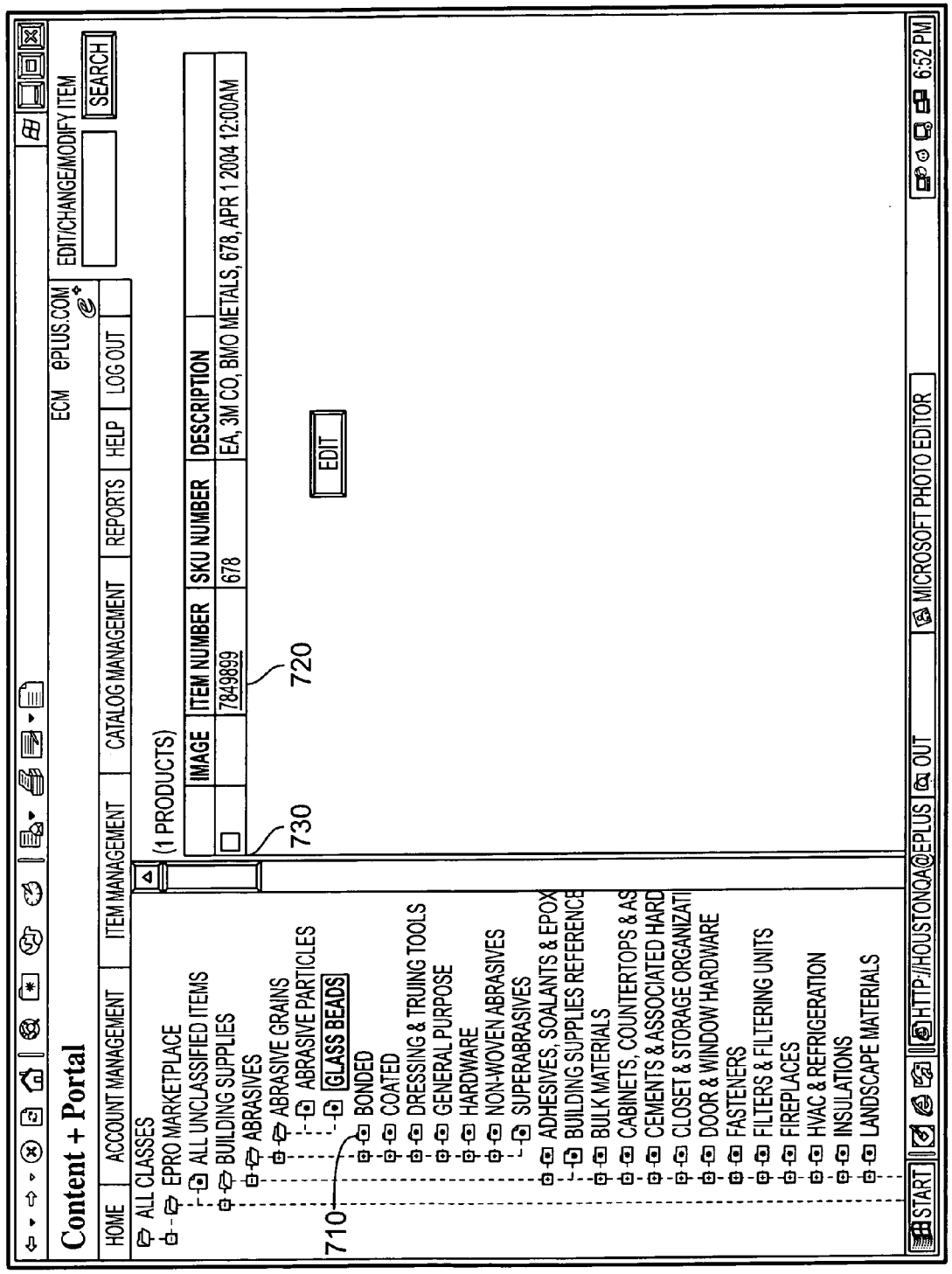
FIG. 7 illustrates an Edit/change/modify Items Page.

To use the Keyword search, In the Search field, the user enters a keyword(s) to find all the classes/items with names that contain the keyword(s) as entered. The Edit/Change/Modify Items page search results—FIG. 6—displays populated with the list of these classes in the top half 610 and the top two hundred item matches in the bottom half 620. The user then chooses an item by selecting an Item Number in the bottom half 620 to edit that item, or selects a class link in the top half 610 to display the Edit/Change/Modify Items page—FIG. 7—for the class To search for an item by navigating the available parent and child classes of the catalog, from the left pane of the page, the user selects the parent class folder under the All Classes folder to display the child class folders of the parent class folder. From the left pane of the page, the user navigates to and selects the class that contains the item to be edited. The Edit/Change/Modify Items page is displayed—FIG. 7.

To display a particular class folder 710 containing an item to edit, the user selects the item by selecting the link of the Item number 720 or checking the box 730 of the item to edit. The Edit Product Record page is displayed—FIG. 8.

3. The user then edits the appropriate fields, as necessary, by entering a new value or selecting an attribute link to choose from a list of available values. The Edit Product Record Page—FIG. 8—shows the product data items. The fields that can be edited 810 include the: item short and long descriptions, type, diameter, material, color, unit of measure, mfg name, mfg model, mfg part number, supplier name, supplier part number, and cost.

Note:
  The item fields change based on the node where the item is classified
  The Short Description field is not editable, because a Supplier Portal according to a preferred embodiment of the present invention builds the value of the Short Description field using the short description pattern associated with the class. If there is no pattern defined for that class then the Short description field is editable.
  While in an Item detail page, a preferred embodiment of a Supplier Portal according to the present invention, highlights attribute values in three colors to notify the user of the changes to those values. They are:
    a. Red: Denotes the new value of any field pending approval,
    b. Green: Denotes the old value of any field pending approval,
    c. Yellow: Denotes that the value in that field is currently awaiting approval in another approvers queue.

Selecting the colored columns provides toggling between the old and new values of a field. Toggling on a Yellow colored attribute value would display the new value in yellow and the old value in Green. Toggling on a Red colored attribute value would display the new value in Red and the old value in Green.

4. To upload a product picture for the product, the user selects the Load Picture option, and then selects Browse to navigate to and select the picture file.

5. To attach a file to the product, the user selects the Attachment option, and then selects Browse to navigate to and select the file.

6. To view the audit history of the product, the user selects the Show Item History link to see the Item History Page—FIG. 9.

The audit history is a list 910 that contains at least the following: the operations performed on a product, the date of an operation, the user who performed it, the type of modification, and a description of the modification. The audit history is used when the user needs to monitor such information as when a product was last modified or who made a certain modification to a product. The data fields include the: event, date, field name, new value, old value, username, approval status, initial approver, current approver, last approver, future approver, rejection code, and rejection description.

8. The user selects Submit.

After the user edits/changes/modifies the product information, a Supplier Portal according to the present invention associates the catalog content product information with a catalog content approval process workflow for the supplier and then, according to the assigned workflow, routes the content to the appropriate Administrator(s) for review and approval.

Delete Items

The following rules apply to Delete Items:
  the Delete Items function is used to delete existing catalog content (product information) manually; and
  a Supplier Portal Administrator can only update the catalog content for the supplier of the approval process workflow they are currently assigned to.

To delete an item manually:

Note—since this process is essentially the same as the edit item process, the screens for this process are not shown, but the process is described 1. From the main menu bar the user selects Item Management>Delete Item to access the Delete Items page. The page has at least two frames. In a preferred embodiment, a left frame provides access to the hierarchical structure of the organization's catalog.

> From the Delete Items page, the user can search for an item to delete by entering a keyword(s) or by navigating the available parent and child classes of the catalog and locating the exact item to delete.
>> Available in the upper-right of the page, the Keyword Search allows the user to quickly search for the items in the catalog by entering the keyword.

2. To use the Keyword search, In the Search field, the user enters at least one keyword to find all the classes/items with names that contain the at least one keyword. The Delete Items page is redisplayed populated with a list of these classes in the top half and the top 200 item matches in the bottom half.

3. The user selects the item by selecting on the Item Number in the bottom half and selects on Submit in the following screen to delete that item. Or the user selects a class link in the top half to display the Delete Items page for the class and proceed to the next step.

4. From the left pane of the page, to search for a class by using the available parent and child classes of the catalog, the user selects the parent class folder under the All Classes folder to display the child class folders of the parent class folder.

5. From the left pane of the page, the user navigates to and displays the class with the item to delete.

6. With the desired class folder displayed, showing the items in that class, the user selects the check box of the item to delete, and then selects the Delete option.

7. A confirmation message appears, asking the user if the user is sure the user wants to delete the selected items. The user can cancel the request or select OK to delete the selected items.

> After the user deletes product information, a Supplier Portal according to the present invention associates the catalog content product information with a catalog content approval process workflow for the supplier and then, according to the assigned workflow, routes the content to the appropriate Administrator(s) for review and approval.

e. Catalog Management

The Catalog Management function of a preferred embodiment allows a Supplier Portal Administrator to perform the steps of:

> Reviewing and approving any catalog content created by a supplier or other portal administrator/s and submitted for review and approval.
> Viewing the catalog as it would be viewed by the requisitioner.
> Defining a template for building a customized short description pattern across all classes, modify and delete an existing short description pattern.

"Approval" refers to catalog content that has not yet been published to an organization's catalog for use because the catalog content is in the process of first being reviewed/approved internally within the organization. Catalog content is not published until the last step (internal to the organization) of the applicable catalog content approval process workflow approves the content for publishing.

With the Catalog Management function the user can view the complete list of catalog content changes that have been submitted for review/approval, including reviewing a submitted catalog content change and responding to it by selecting from any of the options for routing the catalog content.

A Supplier Portal according to a preferred embodiment, notifies the user via email each time catalog content is submitted for the user's review.

Review and Approve Catalog Content

In a preferred embodiment, in order to review/approve catalog content the user performs the following steps:

1. From the Main Menu Bar on the Welcome Page, selecting at least one of Updated Items or New Items or Deleted Items depending on which type of content changes the user wants to review. The Approval Review page—FIG. 10—displays each catalog content change submitted and awaits the user's review.

2. From the Approval Review page—FIG. 10—performing at least one of approving or rejecting items individually, by page, or by all items selected after reviewing them. To facilitate easier reviewing and approval the user can utilize at least one built-in option comprising filtering, sorting, grouping etc.

3. To Group by a particular field, dragging and dropping a column heading into a Drag a column, e.g., textbox 1010, to group the items by a specific column (criteria).

4. Using a filter function 1020 to view a subset of items, by selecting in the top of the screen a field to filter by, selecting an operand, entering filtering criteria, selecting an operator to add additional filtering criteria as needed, and selecting Filter. Note that the operands displayed vary depending on the selected column. Also the filtering criteria are displayed for perusal.

5. Sorting the items in a particular order selecting a desired column header 1030.

6. Changing the order of the display of the fields, by selecting a desired column, dragging it to a desired location and dropping it. A red handle bar displays after the user selects the desired column and begins to move it to the desired location.

7. Approving/denying a catalog content, by selecting the check box next to the catalog content 1040, and then selecting Approve/Reject 1050. Selecting 'OK' on the confirmation message to approve a desired action, or Cancel to stop the approval. To select all the records in the displayed page, the user selects the V button 1060 or to selects all the records, selects the 'Select All' button 1020. To deselect all the selected records, the user selects the 'Unselect All' button next to the 'Select All' button.

8. For Approved items, a preferred embodiment of a Supplier Portal routes the approved catalog content to the next step/level in the approval (workflow) process the content is associated with, and then displays a confirmation message. For Rejected items, a preferred embodiment of a Supplier Portal routes the rejected catalog content to the previous step/level in the approval (workflow) process the content is associated with.

9. Generating a report that lists products being displayed, by right-clicking in the page, then selecting the Export to Excel option that appears.

10. While in the Item detail page, a preferred embodiment of a Supplier Portal highlights attribute values in at least three colors to notify the user of the changes to those values. The colors include:

> a. Red: Denotes the new value of any field pending approval,
> b. Green: Denotes the old value of any field pending approval, and
> c. Yellow: Denotes that the value in that field is currently awaiting approval in another approvers queue.

11. The user may double click on the colored columns to toggle between the old and new values of a field. Toggling on a Yellow colored attribute value displays the new value in yellow and the old value in Green. Toggling on a Red colored attribute value displays the new value in Red and the old value in Green.

Catalog Navigation

The Catalog Navigation function of a preferred embodiment allows a Supplier Portal Administrator to view an organization's catalog as a user of the catalog views the catalog. The Catalog Navigation function allows a user to review the contents of their catalog for ease of navigation and accuracy. In addition, the Catalog Navigation allows the user to at least add a new product, create a new product by copying an existing one, and delete an existing product.

Viewing the Catalog

Figure 11:
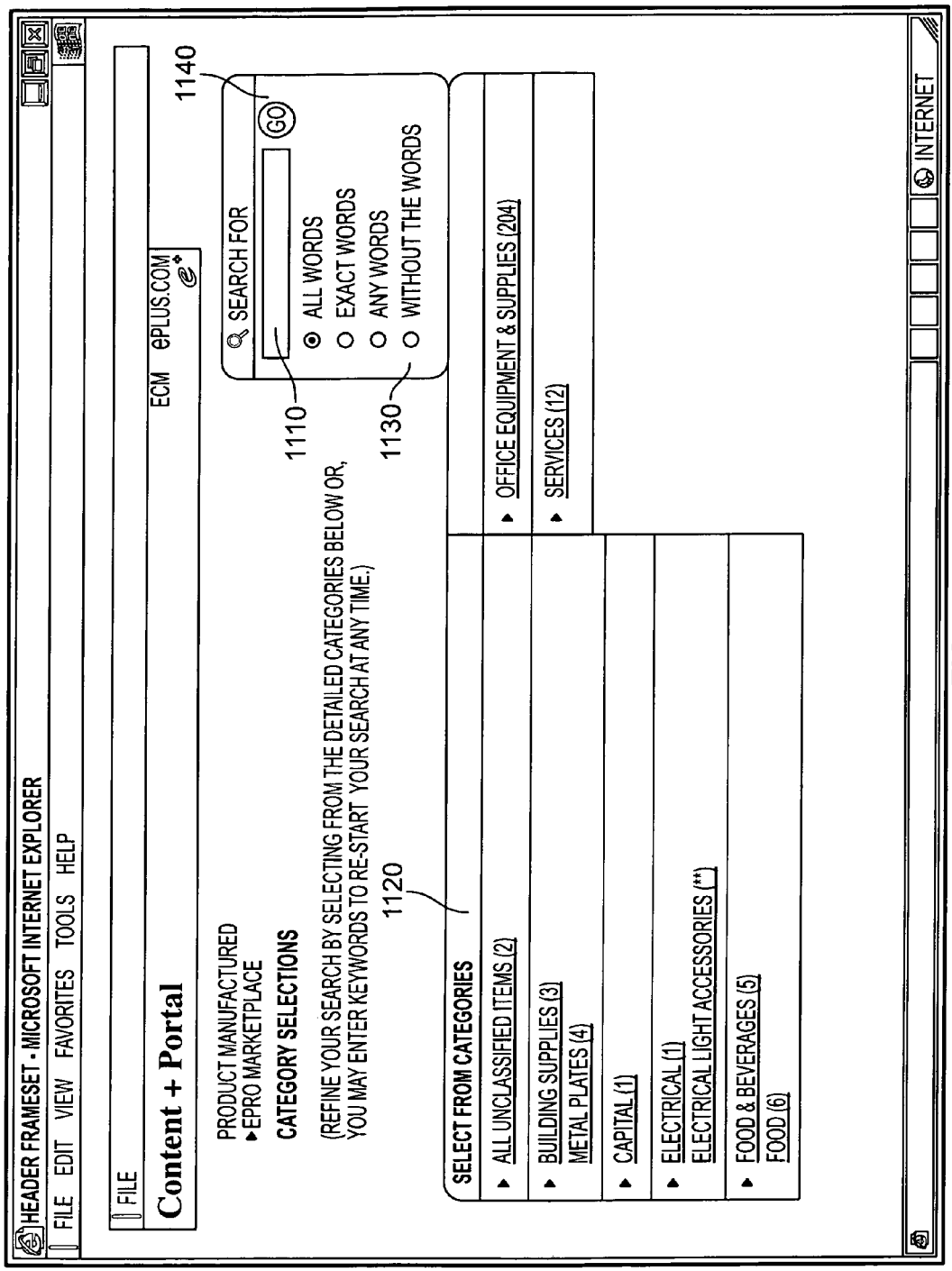
FIG. 11 illustrates a Category Selection Page.

To view the catalog the user performs the following steps:

1. From the welcome page, the user selects Catalog Management>Navigator to access the Category Selections page—FIG. 11. As a central screen of the catalog, the Category Selections page provides easy access to the products available in the catalog. From the Category Selections page, the user searches for a product by entering at least one keyword 1110 or by navigating the available product categories and subcategories 1120 of the catalog. Available in the upper-right of catalog pages, the Keyword Search 1110 allows the user to quickly search for products across the product categories and subcategories of the catalog by entering keywords.

2. To use the Keyword search, In the Search For field 1110, the user enters at least one keyword to find all the products with names that contain the at least one keyword. The user can select the type of search 1130, can select "All Words" to find all the products with descriptions that contain all the entered words, can select "Exact Words" to find all the products with descriptions that contain all the entered words exactly as the user has entered them, can select "Any Words" to find all the products with descriptions that contain any of the words entered, and can select "Without the Words" to find all the products with descriptions that do not contain any of the words entered. After entering the desired at least one keyword, the user selects the Go option 1140.

Figure 12:
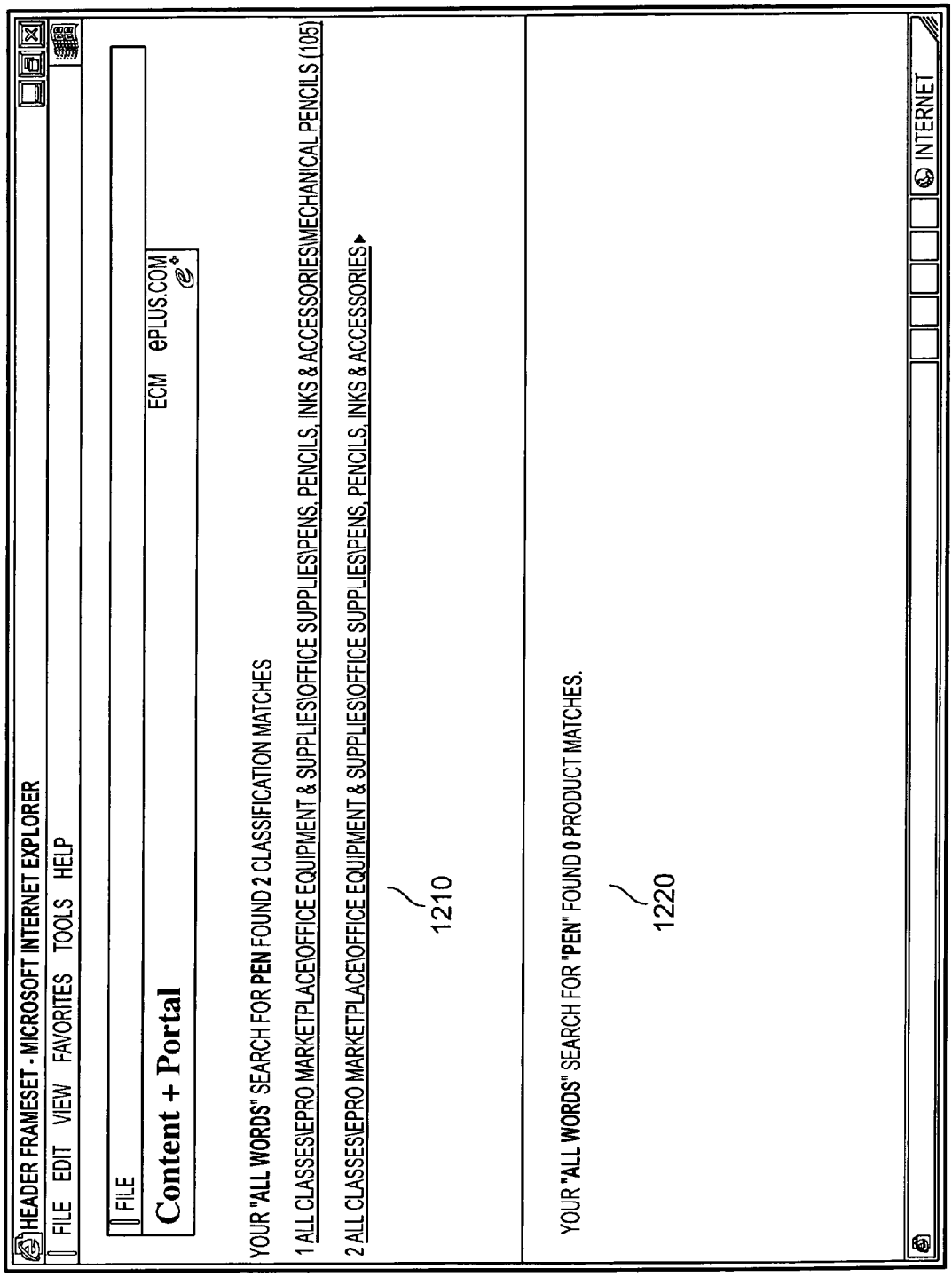
FIG. 12 illustrates a Keyword Search Results Page.

3. A Keyword Search Results page is displayed—FIG. 12—which lists product categories 1210 as well as products 1220 matching search criteria. The Item Matches table displayed in the bottom half of the page lists each product 1220 matching the search criteria, i.e., the at least one keyword entered by the user.

4. To view products by product category, the user selects the category link 1210 from the list in the top half of the page. A Product List page displays.

5. To search for a product using the available product categories and subcategories of the catalog, from the bottom half of the Category Selections page 1220, the user selects the category desired. If applicable, its subcategories are displayed, and these can be selected as well. Otherwise, A Product List page is displayed.

6. From the Product List page—FIG. 13, to view a large picture of a product, the user selects the thumbnail picture of the product 1310. A large picture of the products is displayed.

7. The User selects a column heading link 1320 to access options for sorting product records or filtering based on a specific criteria or hiding an available column. At the bottom of the Product List Page—FIG. 14—The Common Features section 1410 lists any functions that all the displayed products have in common.

8. The user places a pointer over the SKU Number link 1420 of a product to add a new product, to create a new product by copying the product, or to delete the product. A drop down list is displayed 1430 allowing the user to select among these options.

9. To add a new product, the user selects the Add new product option 1430 in the drop down menu. A Product Record page is displayed.

10. To create a new product by copying an existing one, the user selects the Copy product for modification option in the drop down menu 1430 for the product the user wants to copy. A Product Record page is displayed, populated with the values of the product.

11. To delete a product, the user selects the Delete product option in the drop down menu 1430 for the product, and then the user responds to the confirmation message that is displayed by selecting OK.

Figure 15:
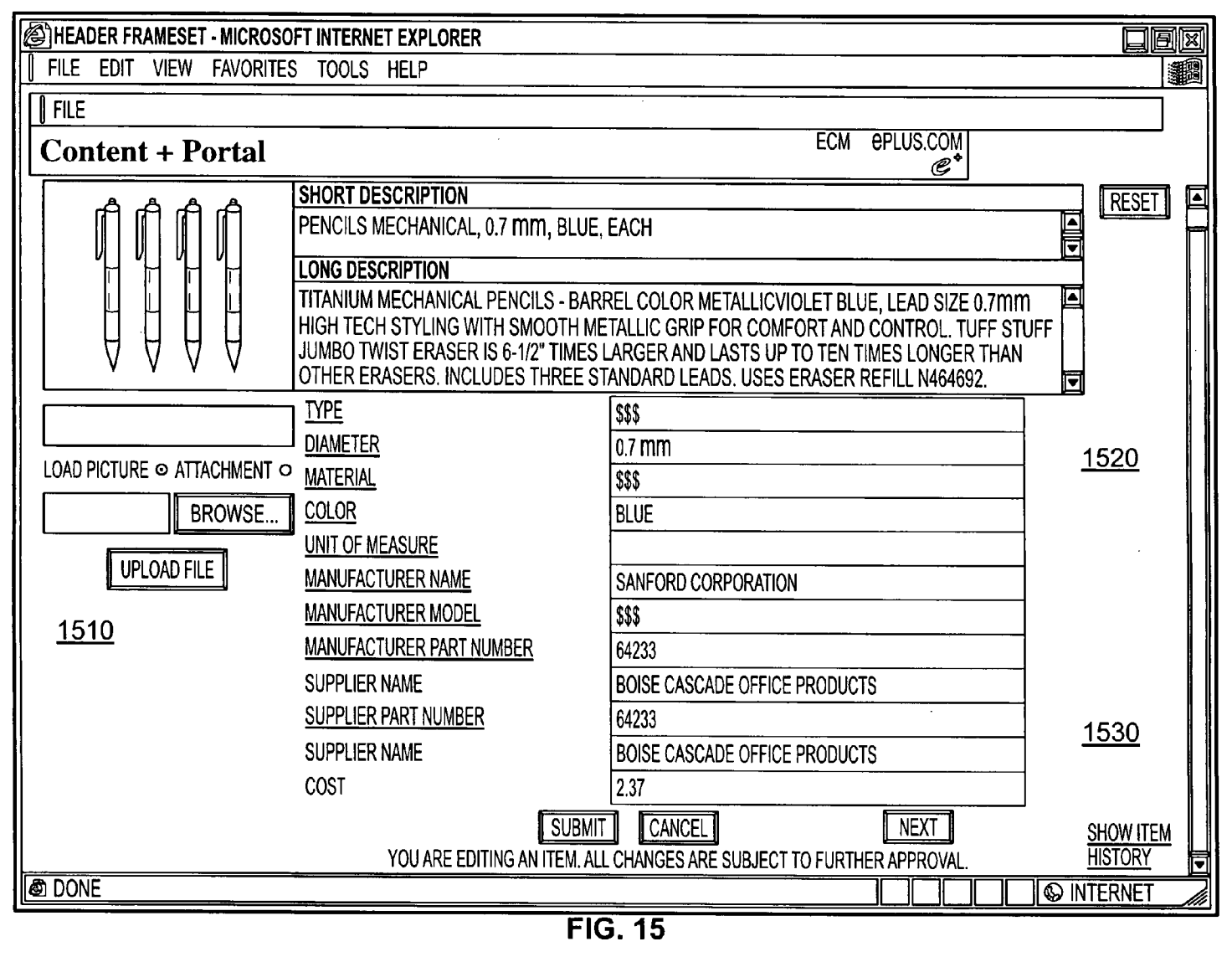

12. To view product detail information, the user selects a SKU Number link 1420 for a product. A Product Information page is displayed—FIG. 15. The Product Information page displays a large picture of the product 1510, and other product attributes 1520, including short and long descriptions, types, diameters, material, color, manufacturer name and model, manufacturer part number, supplier name and part number, 14. To view an Audit History of the product, the user selects the Show Item History link 1530. The Audit History is a list containing the operations performed on a product, the date of an operation, the user who performed each operation, the type of operation, and a description of the operation. The Audit History is useful when the performed a certain operation on a product.

Short Descriptions

This Catalog Management function allows a Supplier Portal Administrator, to create a new supplier short description pattern, and modify or delete an existing supplier short description pattern.

The following rules apply to Short Description Setup:

The Supplier Portal, in a preferred embodiment, implements the hierarchical structure of the organization's catalog. The hierarchical structure consists of the available parent classes and child classes of the catalog. Parent class and child class refer to the groups and subgroups (i.e., levels and sublevels) used to organize the available products of the catalog. Typically, a parent class contains one or more child classes, and a child class contains one or more leaf classes, with leaf classes containing products. Note that Leaf class refers to the lowest level child class in a parent class.

By default, Supplier Portal uses the default short description pattern to build the short description of products in each leaf class of an organization's catalog. The default short description pattern is of the form of Commodity+ each leaf class attribute label and value, where Commodity equals the name of the child (leaf) class. Note that if an attribute class value is blank, the attribute label is not included in the default short description pattern.

The short description builder can be turned on or off for a particular class. If it's 'ON' then either the default pattern is used or the custom pattern built for that class is taken into consideration. If it's 'OFF' then the supplier provided short description is taken into consideration.

Using the Short Description Setup function, the user can define a different short description pattern for each leaf class of an organization's catalog. The Short Description Setup function is helpful if an organization wishes to use short description patterns other than the default short description pattern.

A short description pattern identifies the attributes to be used to build the short description of each item in a leaf class.

When the user displays an item in the catalog, Supplier Portal displays the short description of the item created using the short description pattern of the leaf class of the item. This field is not editable if there is a custom/default pattern defined for that class. On the other hand, it will be editable if the short description builder is set to OFF.

When Supplier Portal is installed, each attribute of the short description pattern of a leaf class is not selected, indicating the default short description pattern is in use for the leaf class. Selecting one or more attributes in the short description pattern of a leaf class indicates the selected short description pattern is to be used for the leaf class instead of the default short description pattern.

Using the Short Description Setup function, the user can also define a short description pattern for the All Classes folder of their organization's catalog, which the application inherits for any leaf level class that does not have defined a short description pattern.

To add a short description pattern for a leaf class, the user performs the following steps:

1. From the welcome page, the user selects Catalog Management>Short Description Template Setup.

2. The Short Description page has at least two frames. A left frame provides access to the hierarchical structure of an organization's catalog. From the Short Description page, the user can search for a leaf class by entering a keyword(s) or by navigating the class tree using the available parent and child classes of the catalog.

To use the Keyword search in the right frame, in the Search field, the user enters at least one keyword to find all the classes with names that contain the entered at least one keyword. The Short Description page redisplays populated with the list of these classes.

To use the class tree search, from the left pane of the page, the user searches for a class by using the available parent and child classes of the catalog. The User selects the parent class folder under the All Classes folder to display the child class folders of the parent class folder. The user selects the desired child class folder. If applicable, its child class folders are displayed. Otherwise, its leaf class node(s) are displayed. The user selects the desired leaf class node. The Short Description Setup page for the selected leaf class is displayed.

3. The Short Description Setup page—FIG. 16—lists the attributes of the selected leaf class 1610, including the base and user-defined attributes of the class. The base attributes 1620 are the same across all the classes. There are at least six base attributes including Manufacturer Name, Manufacturer Model, Manufacturer Part Number, Supplier Name, Supplier Part Number, and Unit of Measure.

4. The Short Description Setup page allows the user to decide whether or not the user wants to use the default pattern for creating a short description (i.e., the base attributes listed above 1620), or create their own pattern. If they want the default pattern, they select the Skip box 1630.

5. If the user wants to create a pattern the user checks either the label 1640 and/or the values 1650 boxes for the attributes the user want included in the short description. The user can check the box next to the labels or values text at the top of the column to select that element for all the attributes. Or the user can select the desired boxes next to each desired attribute to just include the checked elements in the short description.

6. The user can also use the Up and Dn options 1660 in the right of the page to move the selected attributes to the order in which they are to be displayed in a short description.

7. The user selects 'Save' to save this short description configuration for this leaf.

8. If a leaf has not been assigned a short description pattern, the same screen and process can be used to create one.

f. Reports

In a preferred embodiment of a Supplier Portal a Reports module allows a Supplier Portal Administrator to quickly and easily retrieve catalog content information in user-friendly formats. The reports of the module are designed to help the user conduct almost any type of analysis on their catalog content at all stages of the catalog content lifecycle. The Reporting module gives access to pre-defined reports, providing the user with a full range of options.

Standard Reports

Figure 17:
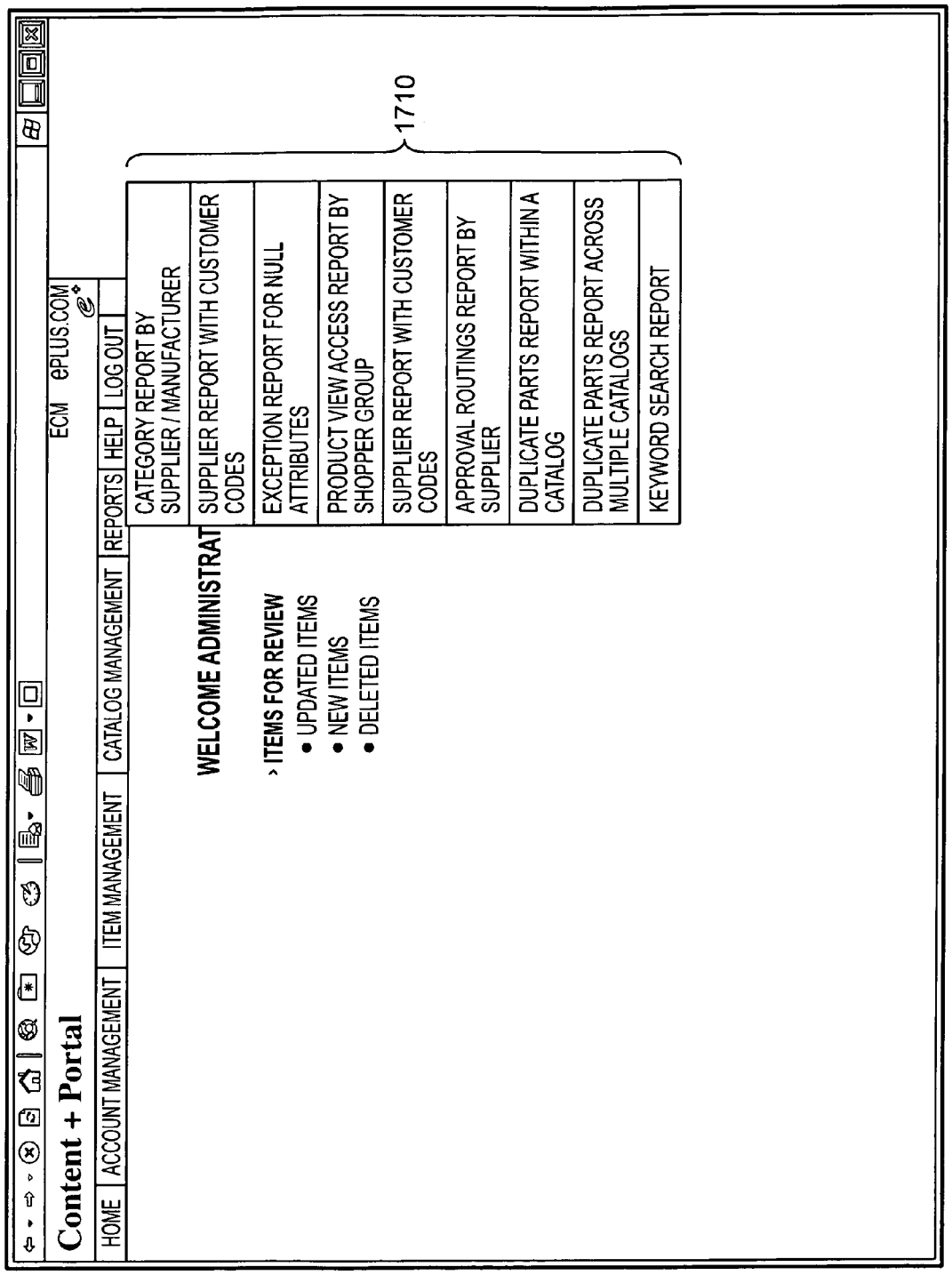
FIG. 17 illustrates a Reports Page.

The Standard reports are listed in FIG. 17, in the drop down menu 1710. The user is prompted for parameters that allow the user to select the desired sub-set of information to be included in that report. The standard reports include:

1. Category Report by Supplier/Manufacturer

This report provides a list of items for a selected supplier, a selected manufacturer, and catalog class/product category. To produce the report, the user selects a link for the report in the Reports page, then selects a desired supplier, manufacturer, and catalog class/product category to be included in the report, and then selects Submit.

2. Supplier Report with Customer Codes

This report provides a list of selected supplier's items with customer codes. To produce the report, the user selects the link for the report in the Reports page, then selects the supplier, and then selects Submit.

3. Exception Report for Null Attributes

This report provides a list of selected supplier's items for which no attributes exist for the selected catalog class/product category. To produce the report, the user selects the link for the report in the Reports page, then selects the supplier and catalog class/product category, and then selects Submit.

4. Product View Access by Shopper Group

This report provides a list of a supplier's shopper groups. To produce the report, the user selects the link for the report in the Reports page, then selects the supplier, and then selects Submit.

5. Suppliers Available to a Shopper Group

This report provides a list of suppliers assigned to a shopper group. To produce the report, the user selects the link for the report in the Reports page, then selects the shopper group, and then selects Submit.

6. Suppliers Assigned to an Individual in Approval Routings

This report provides a list of catalog content approval process workflows an Administrator user is assigned to. To produce the report, the user selects the link for the report in the Reports page, then selects the administrator user account, and then selects Submit.

7. Duplicate Parts within a Catalog

This report provides a list of duplicate items in the catalog for the selected supplier. To produce the report, the user selects the link for the report in the Reports page, then selects the supplier, and then selects Submit.

8. Duplicate Parts across Multiple Catalogs

This report provides a list of duplicate items in the catalog across supplier for the selected manufacturer. To produce the report, the user selects the link for the report in the Reports page, then selects the manufacturer, and then selects Submit.

9. Keyword Search

This report provides a list of all items based on a keyword in the description field. To produce the report, the user selects the link for the report in the Reports page, then selects the keyword, and then selects Submit.

g. Database Schema

Figure 18A:
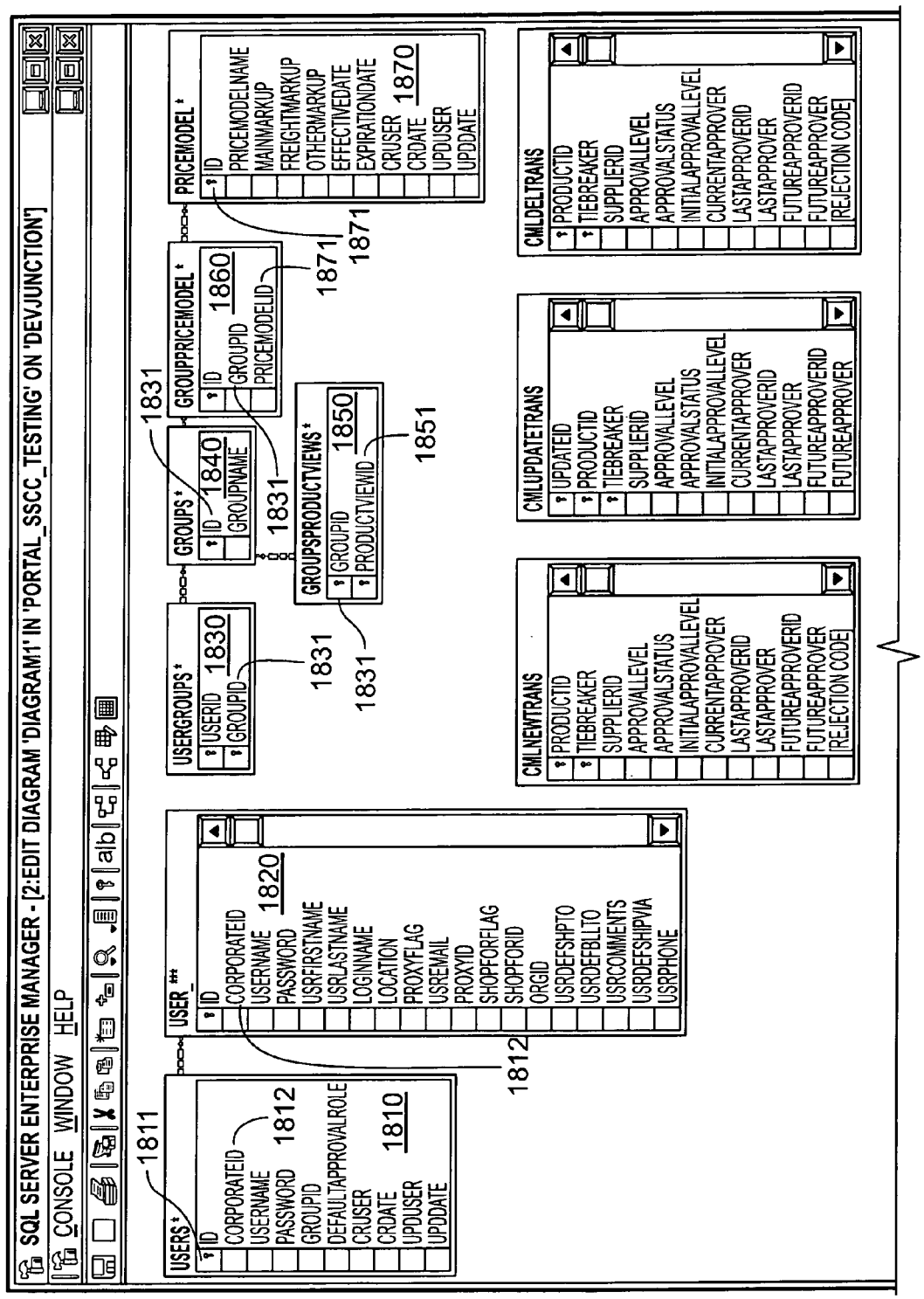
FIGS. 18A and 18B illustrates a Database Schema.
Figure 18B:
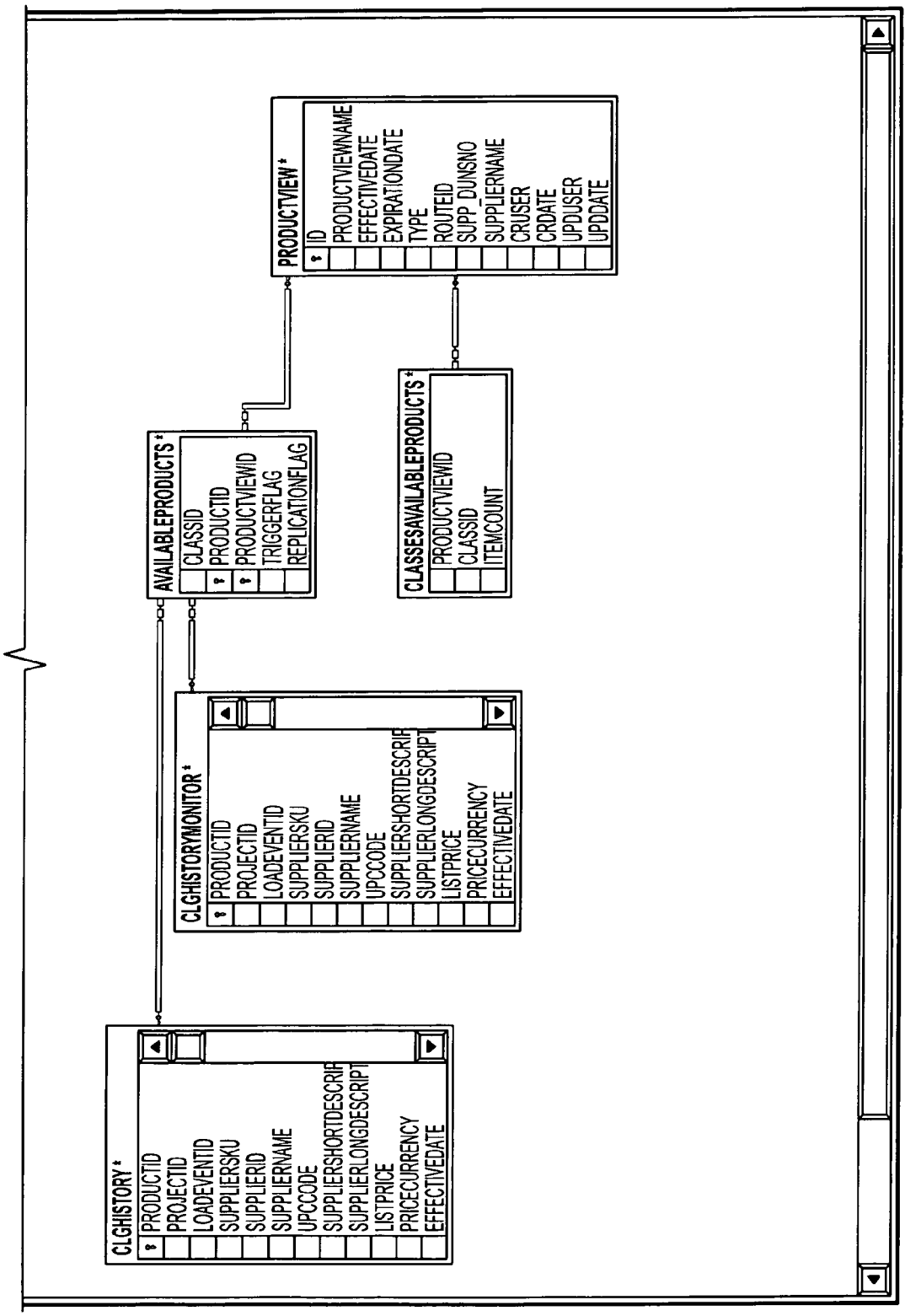

FIG. 18 illustrates components in a database schema that shows selected tables and fields used to support a Supplier Portal according to a preferred embodiment. The items with similar names in multiple tables allow for linking record items from different tables into a consolidated record item. The tables, and the fields they contain, are expanded, modified or deleted, to reflect the business requirements of a supplier organization.

A user and group set of tables of a typical supplier database comprises the tables:
1. Users 1810—defines a supplier user as having an ID 1811 and a CorporateID 1812;
2. UserCust 1820—defines users of the specific supplier;
3. UserGroups 1830—defines a group of users having GroupID 1831;
4. Groups 1840—defines a named group as equivalent to a GroupID 1831 and relates to UserGroups 1830 by this GroupID 1831;
5. GroupsProductViews 1850—defines the product view identified by ProductViewID 1851 as the view of a product 'seen' by a group identified by GroupID 1831;
6. GroupPriceModel 1860—associates a group by GroupID 1831 with a price model by ID1871 in the Price Model table.
7. PriceModel 1870—identifies price models by ID 1871.

Figure 19:
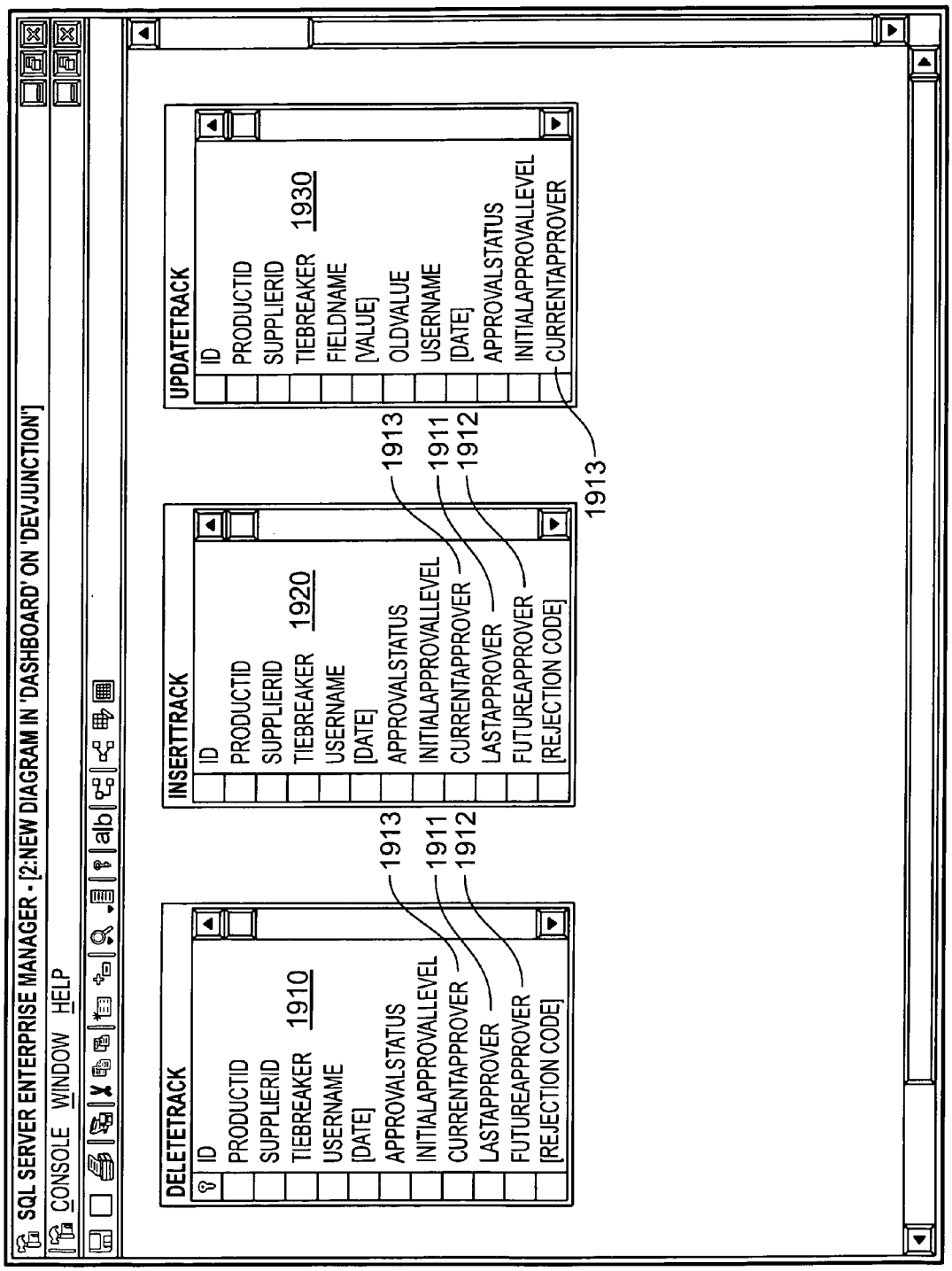
FIG. 19 illustrates a Database Schema for updates to products.

FIG. 19 illustrates a part of a database schema for tracking changes to products made by a supplier using a Supplier Portal according to the present invention. The DeleteTrack table 1910 tracks deletes of existing products, the InsertTrack table 1920 tracks new products to be added to a supplier's catalog of products, and the UpdateTrack table 1930 tracks updates to products that already exist in a supplier's catalog of products. In each of these tracking tables at least three approvers are recorded: current 1911, last 1912 and future 1913 in order to locate the approval position of the tracked change in the supplier's workflow.

The present invention applies to hosted, enterprise, wired and wireless networked implementations of a Supplier Portal wherein user access may be provided from any end-user device including handheld devices (personal digital assistants, wireless telephones), portable devices both wireless and wired, personal computers and workstations both wired and wireless, computer-to-computer access both wired and wireless, all over wireless and wired networks using interfaces such as web browsers and networks such as the internet, and wireless networks such as IEEE 802.11 and Bluetooth. Remote and local hosted implementations of a Supplier Portal are supported also using public and dedicated networks and communication infrastructure.

Figure 20:
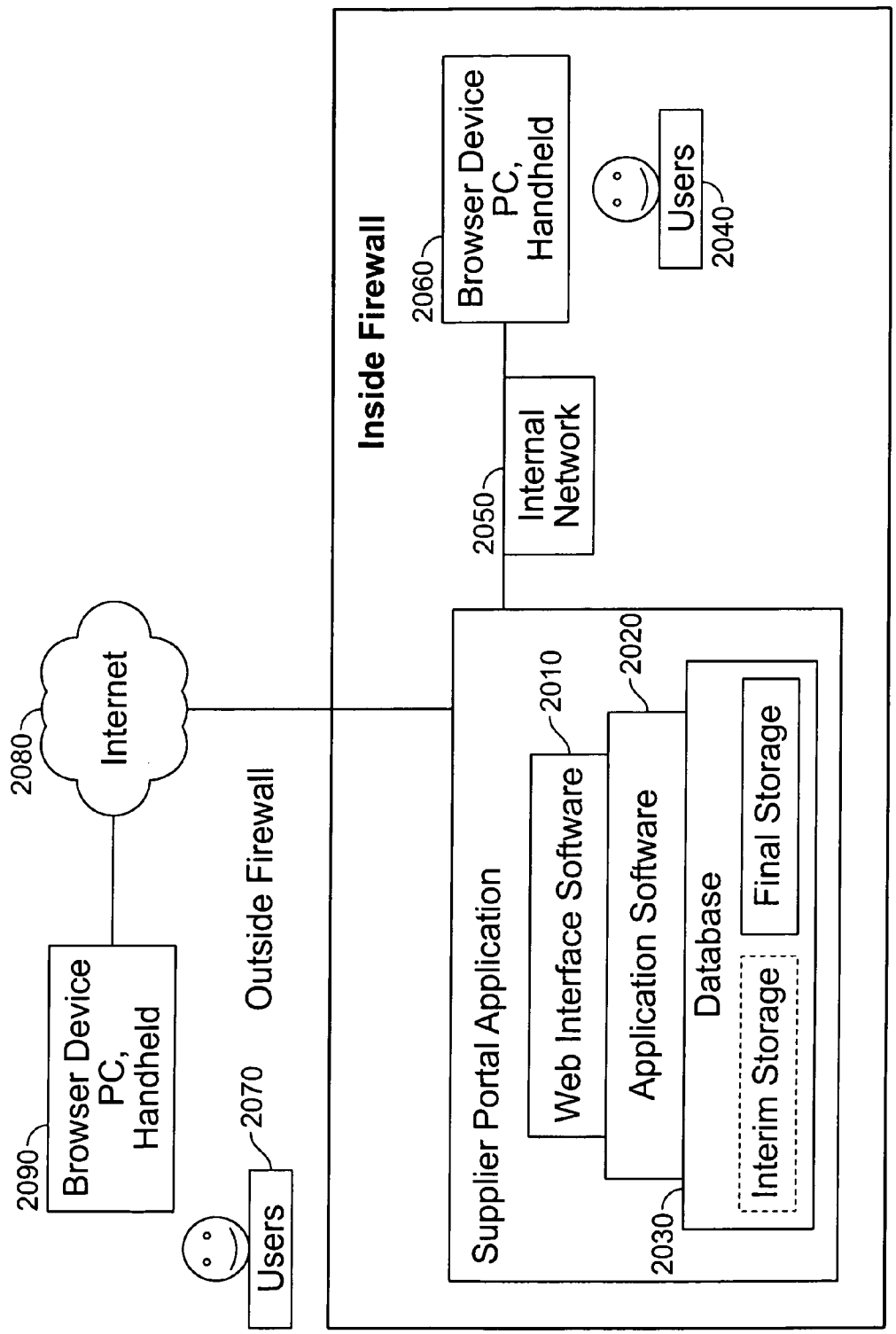
FIG. 20 illustrates a Network Diagram for a Supplier Portal implementation.

FIG. 20 outlines one embodiment of the components in a Supplier Portal implementation. The application is composed of a web interface 2010 that could reside on a web server, an application software 2020 that could also reside on its own server, and a database 2030 that could also reside on its own server and contain separate locations for data in different states of readiness such as interim data that has not been quality controlled, and final data that has been approved and is ready for publication. The application could be accessed by users inside a firewall 2040 over an internal network 2050 using various devices 2060 such as pc or a handheld device that support a browser. Or the application could be accessed by users outside a firewall 2070 over the internet 2080 using various devices 2090 such as a pc or a handheld device that support a browser.

Thus, the Supplier Portal provides a system and method for a supplier of goods and services to personalize the supplier's business persona as presented to the users of a supply chain while the Portal itself imposes conformity that makes it appear to a user that a consistent and integrated business is providing products and services. For example, each supplier provides business rules for how that supplier transacts business with users, roles for administering the business as it appears and occurs to a user of the supply chain, templates for integrating business rules and roles especially for on-line interactions with the Supplier as presented to users of the electronic supply chain. In this way, disparate business methods of a plurality of supply chain partners appear as one while retaining their individuality as business enterprises. This results in a robust supply chain that is easily adapted to changing business paradigms and is easy to use because of the integrity and consistency imposed by the Supplier Portal while users have a choice of suppliers providing different features because they can incorporate their differing ways of doing business, e.g., warranties and discounts and even integration of products and services from other supply chain partners. Each supplier retains an individual identity while appearing as part of a larger, well-functioning whole as a result of the system and method of the present invention for a Supplier Portal.

Figure 21:
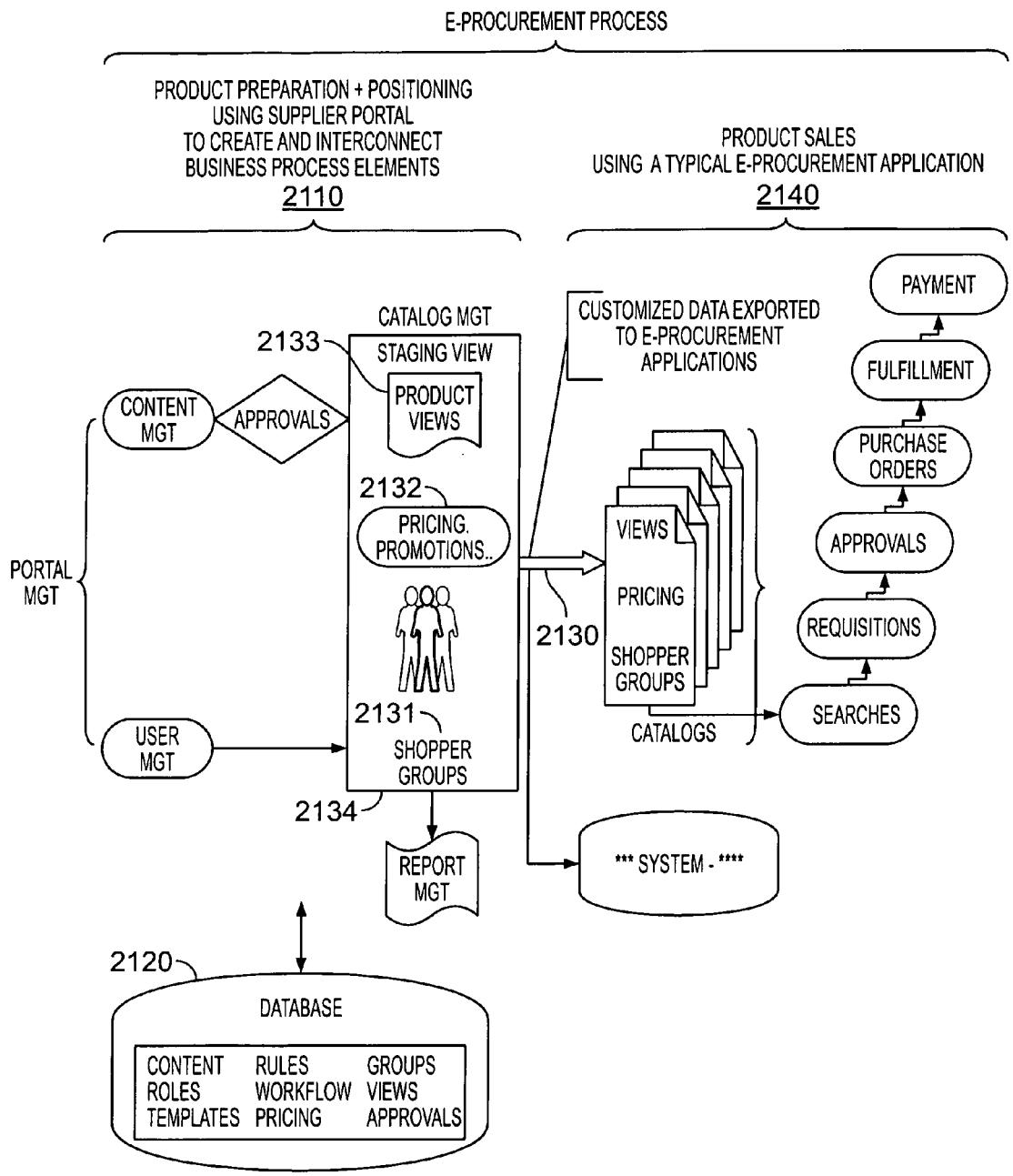
FIG. 21 illustrates the relationship between the supplier portal business process (BP) comprising business process elements (BPEs) and a typical supplier's e-procurement process.

FIG. 21 illustrates a preferred embodiment of the interface between a business process (BP) self-authored by a supplier using the supplier portal system and method of the present invention. This interface comprises business process elements (BPEs) 2110 configured using the present invention and a means of "executing the BPEs" by atypical e-procurement process. The portal system of the present invention 2110 provides typical BPEs that are defined and configured by supplier personnel. The typical BPEs provided by the supplier portal include content management, user management, catalog management, report management, staging area management, and portal administration. In a preferred embodiment, the BP comprises instances of the provided BPEs, self-authored by supplier personnel using the system and method of the present invention. For example, in a preferred embodiment the supplier portal, populates data tables that are stored in a database 2120, and include data for content, roles, templates, rules, workflows, pricing, groups, views, and approvals. The data tables are then accessed by or exported 2130 to a supplier's e-procurement application 2140 or another supplier system such as an on-line sales system.

FIG. 22 illustrates a preferred embodiment of the entries used to configure a BPE including a template 2210, roles 2220, rules 2230, and functions 2240. In a simplified example 2250, a template 2210 defines entries such as a content approval process, which include a template name, description, creator and creation date; at least one approver role 2220; an approval rule 2230, and at least one procedure 2240 to be followed.

Figure 23:
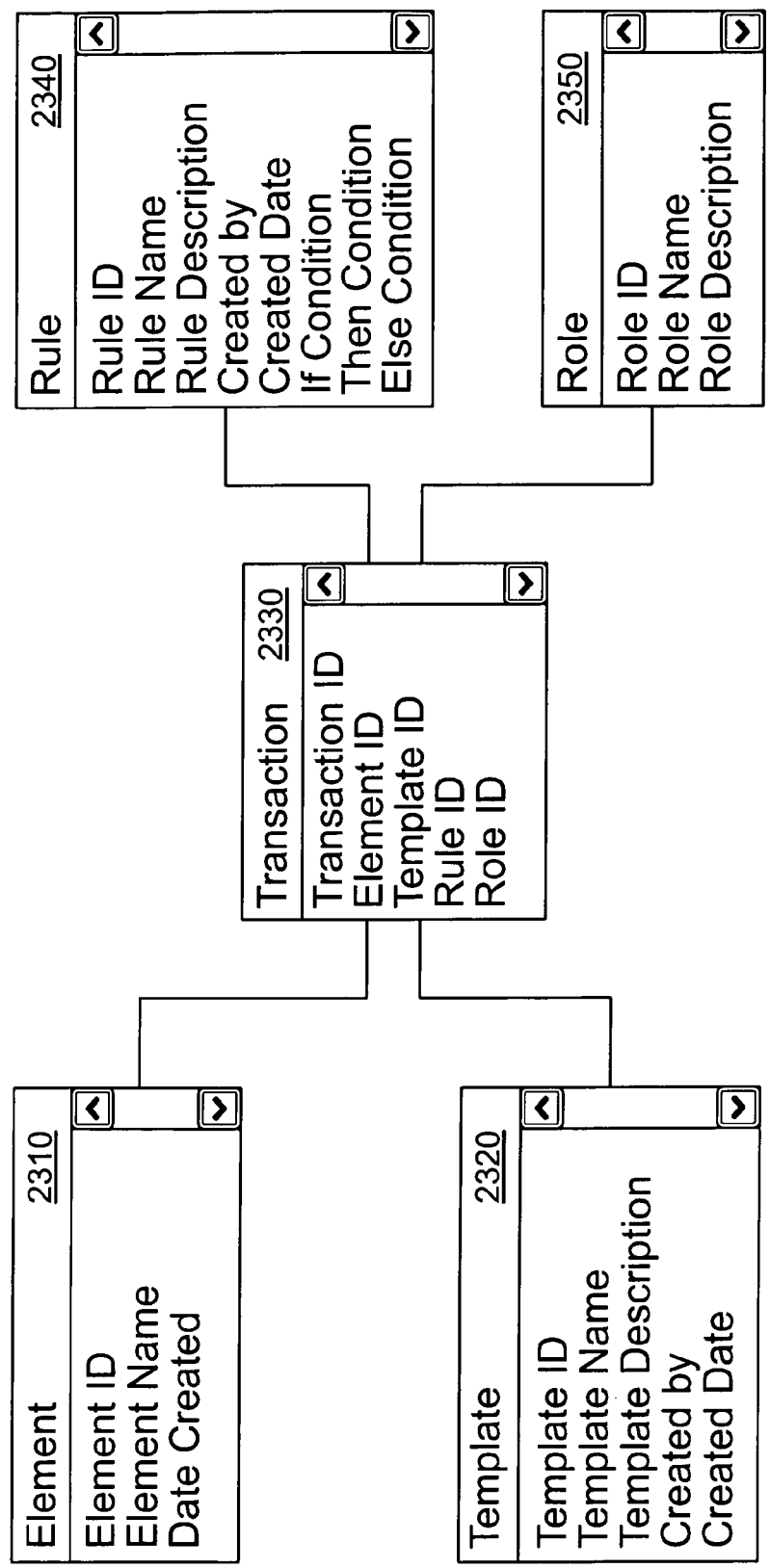
FIG. 23 illustrates tables in a relational database used to store data related to a business process element (BPE).

FIG. 23 illustrates a preferred embodiment of tables in a database that result from configuring a BPE including an element table 2310, a template table 2320, a rule table 2340, and a role table 2350. The configuration transaction table 2330 cross-references the entries stored in these tables for the template, rule and role that in combination configure the BPE.

Multiple configuration transaction records can be used to define a complex element that may contain multiple templates, rules and roles. Within a typical e—procurement system 2140 shoppers search catalogs whose format and content has been specified in a supplier authored BP for preferred items, are presented, e.g., with pricing information that may be based on shopper group participation and product views that have been specified in a supplier authored BP and then go on to use a supplier or other third party system or process to create requisitions, obtain purchasing approvals, create purchase orders and send them to suppliers. The suppliers fulfill orders, submit invoices, and receive customer payments to complete the process.

While the preferred embodiments of the present invention have been illustrated and described, it will be understood by those skilled in the art that the functions and database of a Supplier Portal as described herein are illustrative and various changes and modifications may be made to these functions and database and equivalents may be substituted for elements thereof without departing from the true scope of the present invention. In addition, many modifications may be made to adapt the teachings of the present invention to a particular situation without departing from its central scope, e.g., the database may be flat files or an object base or any combination of alternative data structures. Further, while the present invention has been described from the perspective of the Supplier, the user may well be a Buyer that is consolidating product item data from one or more Suppliers for the purpose of transforming their catalog content into a common buying marketplace that also needs to be self-authored by the Buyer to reflect their culture and purchasing related information needs. Additional parties that may be users of this technology include Content Factories that provide some or all of the services suppliers and buyers require to facilitate buy-sell transactions. Therefore, it is intended that the present invention not be limited to the particular embodiments disclosed as the best mode contemplated for carrying out the present invention, but that the present invention include all embodiments falling with the scope of the appended claims.

APPENDIX A

Supplier Product Input Table (SPI) Data File Layout

The following table is an example of a preferred layout of a Supplier Product Input Table (SPI) data file. The table defines all the fields in an SPI data file, and the type, maximum size, and description for each field. This is the template used in the .xls file used to import catalog content.

| Field Name | Field Type | Max Size | Description | Comments |
|---|---|---|---|---|
| ProductID | Number | 50 | Unique Product identifier. | Not Required |
| ProjectID | Number | 50 | Unique Project/Catalog Identifier | Not Required |
| Supplier SKU | Text | 30 | Indicates the Stock Keeping Unit code/Supplier Part Number for the product. Must be unique for each product. | Required |
| Supplier ID | Number | 50 | A unique identifier for a supplier within Supplier Portal, e.g. the DUNS number. | Required |
| Supplier Name | Text | 80 | Identifies a supplier's name. | Required |
| UPC Code | Text | 12 | Indicates the Universal Product Code for the product, if applicable. | |
| Supplier Short Description | Text | 254 | Associates concise information with a product. Typically, this is the brief version of the supplier's technical description of the product. | Ex: Size, Color. Material, etc. |
| Supplier Long Description | Text | No limit | An expanded description of a product. Typically, this is the supplier's technical and marketing description of the product. | Required |
| List Price | Currency | Automatic | A product's cost per unit of measure. Typically, this is the product's suggested retail price. A value with up to four decimal places may be entered. | Required |
| Price Currency | Text | 50 | Currency used for product's list price. USD is the default currency. Australia (dollar): AUD Belgium (franc): BEF Brazil (Real): BRR Canada (dollar): CAD France (franc): FRF Germany (Mark): DEM Italy (lira): ITL Japan (Yen): JPY Republic of Korea (Korean South) (Won): KRW China (Yuan Renminbi): CNY Spain (peseta): ESP Switzerland (franc): CHF Taiwan (New Taiwan dollar): TWD United Kingdom (pound): GBP United State: USD Euro Currency: EURO | Required |

-continued

| Field Name | Field Type | Max Size | Description | Comments |
|---|---|---|---|---|
| Effective Date | Date/Time | 8 | Indicates the effective date the product is available for shopping. | Applicable to the whole item if the item was never published before. Otherwise, valid for Cost only if it's an existing item. |
| Expiration Date | Date/Time | 8 | If a term applies, indicates the expiration date of the product being not available for shopping. | Applicable to the whole item if the item was never published before. Otherwise, valid for Cost only if it's an existing item. |
| Shippable Unit of Measure (ShipUOM) | Text | 2 | Determines the unit of measure used as a default for requisitions created by the customer organization. For example, if 1-gallon cans of paint are sold in cases of 24 cans, the ShipUOM equals Case and the ShipPkgQty equals one. | Required |
| Cost Unit of Measure (CostUOM) | Text | 2 | Determines the unit of measure used for pricing information entered for a product. Can be the same as or different from the Shippable Unit of Measure. For example, 1-gallon cans of paint may be sold in cases of 24 cans, at $2.00/Can, or $24.00/Case. If sold by the case, the ShipUOM equals Case and the ShipPkgQty equals one. | Required |
| Supplier Action | Text | 4 | Indicates the action to be completed for the incoming data. Valid values are ADD, UPDT, UPPR, and DEL. ADD: Add a new record. UPDR: Update an existing record in whole except ProjectID, SupplierID, SupplierSKU, Image Files, and Unit of measure UPPR: Update price (Cost and List price) of an existing record. DEL: Delete an existing record. | Required |
| Supplier Successor Product | Text | 30 | For a discontinued product, indicates the SKU of a replacement product as recommended by the supplier. | SKU |
| Cost | Currency | 8 | Identifies the cost of the Shippable Packaging Quantity. For example, 1-gallon cans of paint may be sold in cases of 24 cans, at $2.00/Can, or $24.00/Case. if sold by the case, the ShipUOM equals Case and the ShipPkgQty equals one, and the Cost equals $24.00. | Required |
| Cost Currency | Text | 4 | Identifies the currency used for a product's cost. The currency type, USD, is the default currency. | Required |
| Delivery Days | Number | 4 | Specifies (in days) the average lead-time required when ordering the product. Should include the time an item is needed to the time it is received. | |

| Field Name | Field Type | Max Size | Description | Comments |
|---|---|---|---|---|
| Shippable Packaging Quantity | Single | 4 | Designates a quantity for the Shippable Unit of Measure. For example, 1-gallon cans of paint may be sold in cases of 24 cans, at $2.00/Can, or $24.00/Case. If sold by the case, the ShipUOM equals Case and the ShipPkgQty equals one, the Cost equals $24.00, and the ShipPkgQty equals one. | Required |
| Cost Packaging Quantity | Single | 4 | Designates a quantity other than the Shippable Unit of Measure. Can be the same as or different from the Shippable Unit of Measure. For example, 1-gallon cans of paint may be sold in cases of 24 cans, at $2.00/Can, or $24.00/Case, with 10 cases/pallet. If sold by the case, the ShipUOM equals Case and the ShipPkgQty equals one, the Cost equals $24.00, and the ShipPkgQty equals one. If purchased by the pallet, CostUOM equals Pallet and CostPkgQty equals 10. | Required |
| Manufacturer Name | Text | 100 | Identifies the product's manufacturer. | If Available |
| Manufacturer Part Number | Text | 100 | Identifies the product's manufacturer part number. | If Available |
| Purchase Frequency | Text | 1 | | |
| ClassID Determined | Number | Long Integer | | Not Required |
| Class Determined | Text | Unlimited | Example: PipeValvesHosesTubing & Fittings/Valves/GateValves | Not Required |
| COL__label__1 thru COL__label__30 (Total of 30 fields) | Text | 100 | Identifies the name of each attribute (i.e. size, color, material, etc) associated with a product. | If Available. Use these columns to furnish other pertinent product attributes that cannot be filled in other columns. |
| COL__1 thru COL__30 (Total of 30 fields) | Text | 100 | Identifies the value (i.e. 1/2 Inch, Steel, Blue, etc.) of each attribute associated with a product. | If Available. Use these columns to furnish other pertinent product attributes that cannot be filled in other columns. |

The table below provides a description of each available field type.

| Field Type | Definition |
|---|---|
| Text | Alphanumeric characters. |
| Memo | Lengthy text or combinations of text and numbers. Up to 65,535 characters. |
| Long | Long Integer. Numeric data used in mathematical calculations. Integer numbers from −2,147,483,648 to 2,147,483,647 (no fractions). |
| Date/Time | Date and time values. |
| Currency | Currency values and numeric data used in mathematical calculations involving data with one to four decimal places. Accurate to 15 digits on the left side of the decimal separator and to 4 digits on the right side. |
| Yes/No | Yes and No values and fields that contain only one of two values (Yes/No, True/False, or On/Off). |
| Single | Single Integer. Decimal value can go up to 7 digits. |

For valid UNSPSC codes and values, visit the UN/SPSC Web site.

We claim:

1. A supplier portal system for supplier personnel to self-author and self-manage a business process as an interconnection of at least one configurable and namable business process element, comprising:

a host computer system;

at least one database component associated with the host computer;

a communications interface to said computer system for access thereto by said supplier personnel from a plurality of remote input/output devices to self-author and self-manage said business process;

at least one supplier-defined named business rule, named role, named workflow and named function defined and named by said supplier personnel and stored in said at least one database using said communications interface, such that each is respectively referenceable by said rule name, role name, workflow name and function name;

at least one configurable and namable business process element configured with respect to element parameters including at least one each said named business rule, named role, named workflow and named function and stored as a named business process element instance in said database by said supplier personnel using said communications interface, such that said named business process element instance is referenceable by said business process element name;

wherein, said business process is self-authored and self-managed as an interconnection of at least one said named business process element instance and stored as a named business process in said database by said supplier personnel using said communications interface, such that said named business process is referenceable by said business process name; and wherein said business process is used as a front-end catalog process that identifies products, shoppers, and suppliers in which the self-authored and self-managed business process includes automated pattern matching tools to clean and classify catalog product data, wherein said classifying determines using existing patterns or creating new patterns to facilitate classification, wherein said classifying uses a default schema, a new schema, multiple schemas or an adapted standard schema; and wherein said supplier portal lists products and services in a catalog search and product selection front-end for said at least one of a procurement system and a online sales and purchasing system.

2. The supplier portal system of claim 1, wherein said at least one named workflow is a workflow that defaults to approval.

3. The supplier portal system of claim 1, wherein said at least one configurable business process element includes content management, user management, catalog management, report management, staging area management, and portal administration.

4. The supplier portal system of claim 3, wherein a named business process element further comprises a plurality of named business process elements.

5. The supplier portal system of claim 3, wherein said content management business process element comprises a configurable template to define a structure for content management as including a plurality of named functions selected from the group consisting of the importation of raw content items, the cleansing of raw content item data to make it complete and accurate, the normalization and rationalization of cleansed content item data to make it consistent, the classification of normalized and rationalized content items, the extraction of value from content items data, the addition of content item attributes, the addition of content item data comprising intuitive short description summaries composed from selected data items, the addition of content item attachments comprising pictures, drawings, warranties, the storage of content data in first a temporary data storage area that after approval is then stored in a permanent data storage area, a search for content items, the approval of content items as rich content ready for implementation, and the publication of rich content items.

6. The supplier portal system of claim 3, wherein said catalog management business process element comprises a configurable template to define a structure of catalog management as including a plurality of named functions selected from the group consisting of the importation of product items and their item content data into a catalog, the creation of at least one named product view comprising a hierarchy of categories and subcategories to facilitate search, the definition of product views by a plurality of categories including commodity type and shopper group type, the assignment of rich content items to named product views, the definition of a plurality of named catalog navigation rules, the definition of a plurality of named catalog search rules, the definition of a plurality of named catalog access rules, and the tracking of import data changes and catalog data updates.

7. The supplier portal system of claim 3, wherein said user management business process element comprises a configurable template to define a structure of user management as including a plurality of named functions selected from the group consisting of the definition of a plurality of user role and approver roles, the definition of a plurality of authorization rights, the definition of a plurality of user access rights, the creation and management of a plurality of user accounts, the creation and management of a plurality of user profiles, the assignment of a least one of said plurality of roles to each of said plurality of users, the creation of at least one shopper group, the assignment of each user to at least one of said shopper group.

8. The supplier portal system of claim 7, wherein: said plurality of user roles are selected from the group consisting of approver, supplier, shopper, and administrator; said plurality of approver roles is selected from the group consisting of supplier, material expert, supplier allower, local controller, commodity manager, and additional approvers.

9. The supplier portal system of claim 3, wherein said report management business process element comprises a configurable template to define a structure of report management as including a plurality of named functions selected from the group consisting of the selection of reports from a plurality of standardized report options, the selection of at least one parameter option to customize parameterized reports, the formulation of an ad-hoc query of a database to obtain personalized reports, the selection of a report output method from the group consisting of print, save to a named file, send to an output device, send to a named application, and send to an address on a network.

10. The supplier portal system of claim 3, wherein said staging area management business process element comprises a configurable template to define a structure of staging area management as including a plurality of named functions selected from the group consisting of the name of a staging area, the selection of at least one product and product view, the specification of at least one shopper and shopper group, and the specification of a plurality of procurement data therefore selected from the group consisting of Item Pricing and timeframe, Promotional Pricing and timeframe, and Discount Pricing and timeframe.

11. The supplier portal system of claim 3, wherein said portal administration business process element comprises a configurable template to define a structure of portal administration as including a plurality of named functions selected from the group consisting of the creation of a plurality of portal administrator accounts, the registration of a portal administrator that includes a plurality of portal administrator data, assignment of a plurality of portal administrator access rights, the creation and maintenance of a plurality of supplier specific approval workflows, the administration of a plurality of user password information.

12. The supplier portal system of claim 3, wherein the staging area business process element further includes a component that executes a named business process to demonstrate how the named business process, comprising at least one named business process element, works.

13. The supplier portal system of claim 1, wherein said at least one business rule is selected from the group consisting of approval rule, pricing rule, shopper access rule, product view rule, shopper group rule, user account rule, data classification rule, data management rule, data reporting rule, catalog navigation rule, database search rule, short description rule, and staging area rule.

14. The supplier portal system of claim 1, wherein said plurality of remote input/output devices is selected from the group consisting of a computer, a laptop, a hand-held computing device, a PDA (personalized data assistant), a tablet computer, and a voice activated device.

15. The supplier portal system of claim 1, wherein: an instance of a business process element is defined using a template having a plurality of entries and a plurality of selectable items, and components selected from the group consisting of template and business process element, the template and each said component having an associated plurality of roles to specify the users that have access to the component, an associated plurality of business rules each said rule to constrain a function of the template performed by the business process element and each said component in the customized business process, an associated plurality of approval workflows and approvers to review and approve the results of a function of the business process element in accordance with the associated plurality of approval workflows; wherein said business process element is named and stored in said database for subsequent use, modification, and re-use in BPs and business process elements.

16. The supplier portal system of claim 1, where said at least one named workflow comprises an approval workflow selected from the group consisting of content data file import approval workflow, product-item content approval workflow, user account approval workflow, user grouping approval workflow, content-item pricing approval workflow, user and user-group product view approval workflow, and catalog packaging and presentation approval workflow wherein a workflow is a time-ordered sequence of at least one approval step and associated approver such that each said at least one approver must approve an action of a corresponding business process element for the action to be approved.

17. A method for self-authoring and self-managing by supplier personnel a customized business process for a catalog search and product selection front-end to at least one of a system, process and application for e-procurement, online sales and purchasing, comprising the steps of:

defining by said supplier personnel at least one named business rule, named role, named workflow and named function at a server;

storing said at least one supplier-defined named business rule, named role, named workflow and named function in a database being respectively referenceable therein by said rule name, role name, workflow name and function name;

providing at least one configurable business process element;

configuring by said supplier personnel at least one business process element with respect to element parameters including at least one each said named business rule, named role, named workflow and named function;

storing said named and supplier-configured business process element in said database referenceable therein by said business process element name;

interconnecting by said supplier personnel said at least one named and configured business process element as a named business process;

storing said named business process in said database referenceable therein by said business process name;

identifying products and suppliers using said stored business process as a front-end catalog process;

classifying said products and suppliers using automated pattern matching tools to clean and classify catalog product data, wherein said classifying determines using existing patterns or creating new patterns to facilitate classification, and wherein said classifying uses a default schema, a new schema, multiple schemas or an adapted standard schema; and listing products and services in a catalog search and product selection front-end for said at least one of a system, process and application for e-procurement, online sales and purchasing.

18. The method of claim 17, wherein the named workflow of said configuring step is a workflow that defaults to approval.

19. The method of claim 17, wherein the step of providing at least one configurable business process element further comprising the step of including in said configurable business process element a template to define a structure and associated business rules, roles, workflows and functions comprising the business process element.

20. The method of claim 17, wherein said template further comprises one of at least one other template and at least one business process element.

21. The method of claim 17, wherein said business process element is selected from the group consisting of content management, user management, catalog management, report management, staging area management and portal management.

22. The method of claim 21, wherein the staging area business process element further includes a component that executes a named business process to demonstrate how the named business process, comprising at least one named business process element, works.

* * * * *